US012795121B2

(12) United States Patent
Lim

(10) Patent No.: US 12,795,121 B2
(45) Date of Patent: Nov. 10, 2026

(54) VIDEO SIGNAL ENCODING/DECODING METHOD, AND RECORDING MEDIUM HAVING BITSTREAM STORED THEREIN

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 79 days.

(21) Appl. No.: 18/720,607

(22) PCT Filed: Dec. 16, 2022

(86) PCT No.: PCT/KR2022/020616
§ 371 (c)(1),
(2) Date: Nov. 28, 2024

(87) PCT Pub. No.: WO2023/113551
PCT Pub. Date: Jun. 22, 2023

(65) Prior Publication Data

US 2025/0324070 A1 Oct. 16, 2025

(30) Foreign Application Priority Data

Dec. 17, 2021 (KR) ........................ 10-2021-0182014

(51) Int. Cl.
*H04N 19/176* (2014.01)
*H04N 19/12* (2014.01)
(Continued)

(52) U.S. Cl.
CPC ........... *H04N 19/176* (2014.11); *H04N 19/12* (2014.11); *H04N 19/159* (2014.11); *H04N 19/198* (2014.11)

(58) Field of Classification Search
CPC .... H04N 19/176; H04N 19/12; H04N 19/159; H04N 19/198
(Continued)

(56) References Cited

U.S. PATENT DOCUMENTS

2015/0139303 A1 5/2015 Sato
2018/0176556 A1 6/2018 Zhao et al.
(Continued)

FOREIGN PATENT DOCUMENTS

KR 10-2149023 B1 8/2020
KR 10-2020-0110442 A 9/2020
(Continued)

OTHER PUBLICATIONS

A. Filippov, V. Rufitskiy, A. Karabutov, and J. Chen, "Residual sign prediction in transform domain for next-generation video coding," APSIPA Transactions on Signal and Information Processing, vol. 8, p. e24, 2019. doi:10.1017/ATSIP.2019.6 (Year: 2019).*
(Continued)

*Primary Examiner* — Justin W Rider
(74) *Attorney, Agent, or Firm* — IP Legal Services, LLC

(57) ABSTRACT

An image decoding method according to the present disclosure comprises the steps of: determining whether sign prediction for at least one residual coefficient is applied; when it is determined that the sign prediction is applied, deriving a reconstruction block for each of sign combinations applicable to the at least one residual coefficient; calculating a cost of each of a plurality of reconstruction blocks; and obtaining a reconstruction block on the basis of sign prediction information about the at least one residual coefficient to which the sign prediction is applied, and the cost of each of the plurality of reconstruction blocks.

13 Claims, 15 Drawing Sheets

(51) Int. Cl.
*H04N 19/159* (2014.01)
*H04N 19/196* (2014.01)

(58) Field of Classification Search
USPC ..................................................... 375/240.12
See application file for complete search history.

(56) References Cited

U.S. PATENT DOCUMENTS

| | | | |
|---|---|---|---|
| 2018/0176563 | A1 | 6/2018 | Zhao et al. |
| 2018/0176582 | A1 | 6/2018 | Zhao et al. |
| 2020/0396488 | A1 | 12/2020 | Koo et al. |
| 2020/0404257 | A1 | 12/2020 | Filippov et al. |
| 2020/0404311 | A1 | 12/2020 | Filippov et al. |
| 2021/0014509 | A1 | 1/2021 | Filippov et al. |
| 2022/0109892 | A1 | 4/2022 | Koo et al. |
| 2024/0146976 | A1 | 5/2024 | Koo et al. |
| 2025/0008111 | A1* | 1/2025 | Yoo ...................... H04N 19/132 |

FOREIGN PATENT DOCUMENTS

| | | | |
|---|---|---|---|
| KR | 10-2020-0112964 | A | 10/2020 |
| WO | 2019/172802 | A1 | 9/2019 |

OTHER PUBLICATIONS

Korean Intellectual Property Office, International Search Report of International Application No. PCT/KR2022/020616, Mar. 16, 2023.
Korean Intellectual Property Office, Written Opinion of International Application No. PCT/KR2022/020616, Mar. 16, 2023.
Jumpei Koyama et al., "Coefficient Sign Bit Compression in Video Coding", 2012 Picture Coding Symposium, May 7-9, 2012, pp. 385-388, IEEE.
European Patent Office, Extended European Search Report of corresponding EP Patent Application No. 22908016.3, Oct. 14, 2025.

* cited by examiner

| | | | |
|---|---|---|---|
| C0 | C2 | C5 | C9 |
| C1 | C4 | C8 | C12 |
| C3 | C7 | C11 | C14 |
| C6 | C10 | C13 | C15 |

Residual block

VIDEO SIGNAL ENCODING/DECODING METHOD, AND RECORDING MEDIUM HAVING BITSTREAM STORED THEREIN

CROSS REFERENCE TO RELATED APPLICATIONS

This application is a National Stage Patent Application of PCT International Patent Application No. PCT/KR2022/020616 (filed on Dec. 16, 2022) under 35 U.S.C. § 371, which claims priority to Korean Patent Application No. 10-2021-0182014 (filed on Dec. 17, 2021), the teachings of which are incorporated herein in their entireties by reference.

TECHNICAL FIELD

The present disclosure relates to a method and a device for processing a video signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

The present disclosure is to provide a method for omitting encoding/decoding of sign information for at least one residual coefficient and a device for performing the same.

The present disclosure is to provide a method for predicting a sign of a residual coefficient for which encoding/decoding of sign information is omitted and a device for performing the same.

The present disclosure is to provide a method for deriving an optimal reconstructed block by using a reconstructed sample around a current block and a device for performing the same.

Technical effects of the present disclosure may be non-limited by the above-mentioned technical effects, and other unmentioned technical effects may be clearly understood from the following description by those having ordinary skill in the technical field to which the present disclosure pertains.

Technical Solution

An image decoding method according to the present disclosure may include determining whether sign prediction for at least one residual coefficient is applied, when it is determined that the sign prediction is applied, deriving a reconstructed block for each of sign combinations applicable to the at least one residual coefficient, calculating a cost of each of a plurality of reconstructed blocks, and obtaining a reconstructed block based on sign prediction information about the at least one residual coefficient to which the sign prediction is applied and a cost of each of the plurality of reconstructed blocks.

An image decoding method according to the present disclosure may deriving a reconstructed block for each of sign combinations applicable to at least one residual coefficient, calculating a cost of each of a plurality of reconstructed blocks, and for the at least one residual coefficient, encoding sign prediction information indicating whether a sign of the at least one residual coefficient used to derive a reconstructed block with the lowest cost among the plurality of reconstructed blocks matches an actual sign combination.

In an image encoding/decoding method according to the present disclosure, when the sign prediction is applied, sign information is explicitly signaled for the remaining residual coefficients excluding the at least one residual coefficient, while signaling of sign information may be omitted for the at least one residual coefficient.

In an image encoding/decoding method according to the present disclosure, the at least one residual coefficient may include a residual coefficient that is a DC component.

In an image encoding/decoding method according to the present disclosure, the at least one residual coefficient may include a residual coefficient at a last non-zero position.

In an image encoding/decoding method according to the present disclosure, a cost of a reconstructed block may be acquired based on at least one of a vertical directional cost obtained based on top reconstructed samples positioned at a top boundary of the reconstructed block and a horizontal directional cost obtained based on reconstructed samples positioned at a left boundary of the reconstructed block.

In an image encoding/decoding method according to the present disclosure, when an intra prediction mode of the current block is a non-directional intra prediction mode, the cost of the reconstructed block may be determined as a sum of the horizontal directional cost and the vertical directional cost.

In an image encoding/decoding method according to the present disclosure, when an intra prediction mode of the current block is a directional prediction mode, the cost of the reconstructed block may be determined to be equal to the horizontal directional cost or the vertical directional cost.

In an image encoding/decoding method according to the present disclosure, whether it is allowed to apply the sign prediction to the current block may be determined based on at least one of a size of the current block, a quantization parameter, an encoding mode, an intra prediction mode or whether transform skip is applied to the current block.

In an image encoding/decoding method according to the present disclosure, the sign prediction information may represent whether a sign of a residual coefficient used to derive a reconstructed block with the lowest cost among the plurality of reconstructed blocks matches an actual sign.

In an image encoding/decoding method according to the present disclosure, the sign prediction information may be encoded based on probability information, and the probability information may be determined based on a position of the at least one residual coefficient.

The features briefly summarized above with respect to the present disclosure are just an exemplary aspect of a detailed description of the present disclosure described below, and do not limit a scope of the present disclosure.

Technical Effect

According to the present disclosure, encoding/decoding of sign information for at least one residual coefficient may be omitted, reducing signaling overhead.

Effects obtainable from the present disclosure are not limited to the above-mentioned effects and other unmentioned effects may be clearly understood from the following description by those having ordinary skill in the technical field to which the present disclosure pertains.

BEST MODE

Figure 1:
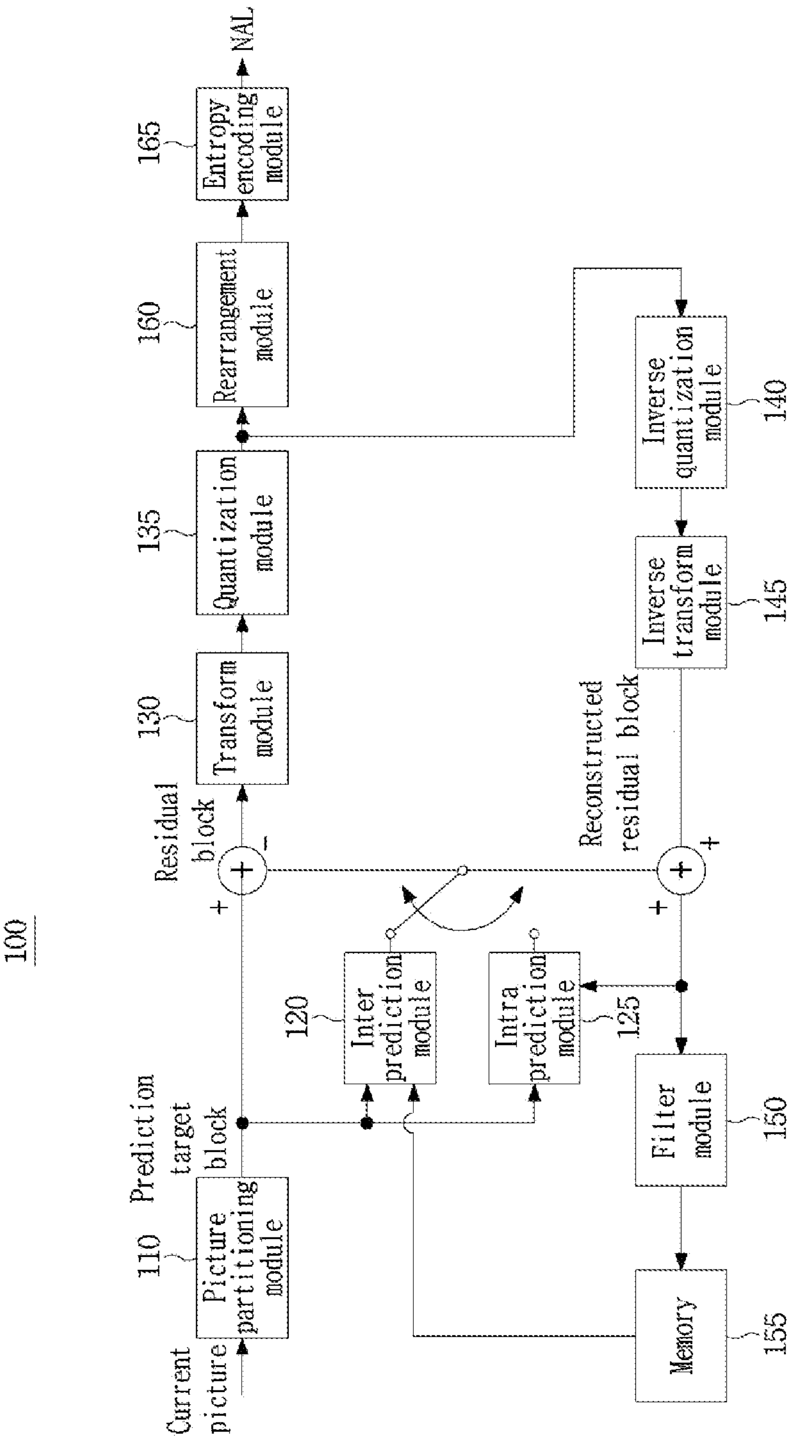
FIG. 1 is a block diagram showing an image encoding device according to an embodiment of the present disclosure.

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree, a ternary tree or a binary tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In an example, when it is assumed that quad tree partitioning is applied to one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

In intra prediction, a transform unit may be configured to be the same as a prediction unit. In this case, after partitioning a coding unit into a plurality of transform units, intra prediction may be performed per each transform unit. A coding unit may be partitioned in a horizontal direction or in a vertical direction. The number of transform units generated by partitioning a coding unit may be 2 or 4 according to a size of a coding unit.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a coding unit and prediction may be performed in a prediction unit or a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information which is pixel information in a current picture. Reference pixel information may be derived from selected one of a plurality of reference pixel lines. A N-th reference pixel line among a plurality of reference pixel lines may include left pixels whose x-axis difference with a top-left pixel in a current block is N and top pixels whose y-axis difference with the top-left pixel is N. The number of reference pixel lines which may be selected by a current block may be 1, 2, 3 or 4.

When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least information of available reference pixels. A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position.

An intra prediction method may generate a prediction block after applying a smoothing filter to a reference pixel according to a prediction mode. According to a selected reference pixel line, whether a smoothing filter is applied may be determined.

In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on at least one of a size of a transform unit, a form of a transform unit, a prediction mode in a prediction unit or intra prediction mode information in a prediction unit.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction, horizontal scan where a coefficient in a shape of a two-dimensional block is scanned in a row direction or diagonal scan where a coefficient in a shape of a two-dimensional block is scanned in a diagonal direction may be used. In other words, which scan method among zig-zag scan, vertical directional scan, horizontal directional scan or diagonal scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of a characteristic of a block to be applied.

A memory 155 may store a reconstructed block or picture calculated through a filter unit 150 and a stored reconstructed block or picture may be provided to prediction units 120 and 125 when performing inter prediction.

Figure 2:
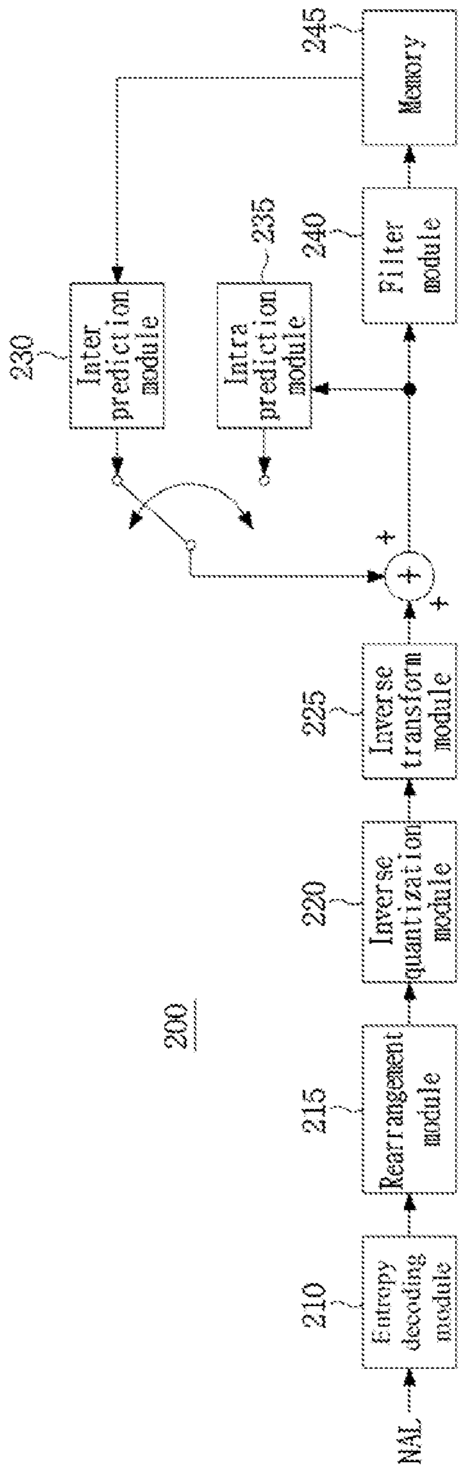
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size or a shape of a current block, a prediction mode, an intra prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit) or a block to which an in-loop filter is applied, etc. according to an encoding/decoding step. In this specification, 'unit' may represent a base unit for performing a specific encoding/decoding process and 'block' may represent a pixel array in a predetermined size. Unless otherwise classified, 'block' and 'unit' may be used interchangeably. For example, in the after-described embodiment, it may be understood that a coding block (a coding block) and a coding unit (a coding unit) are used interchangeably.

Furthermore, a picture including a current block is referred to as a current picture.

In encoding a current picture, duplicate data within a picture or duplicate data between pictures may be removed. Specifically, after generating a prediction value for an original value of a pixel, a residual value may be generated by subtracting a prediction value from an original value. As above, by removing a prediction value, duplicate data within a picture or duplicate data between pictures may be removed.

A picture may be partitioned into blocks and encoded/decoded. Accordingly, prediction may be performed in a unit of a block. As an example, an encoder may perform prediction for a block and generate a residual block by subtracting a prediction block generated as a result of prediction from an original block. A decoder may reconstruct a block by combining a reconstructed residual block and a prediction block.

When lossless encoding is performed for a picture, an original block and a reconstructed block reconstructed by a decoder are identical to each other. On the other hand, if loss encoding was performed for a picture, there may be some differences between an original block and a reconstructed block reconstructed by a decoder.

Duplicate data between blocks may be removed through intra prediction or inter prediction. Hereinafter, it is described in detail.

Intra prediction may be performed based on at least one of a plurality of intra prediction modes predefined in an encoder and a decoder.

Figure 3:
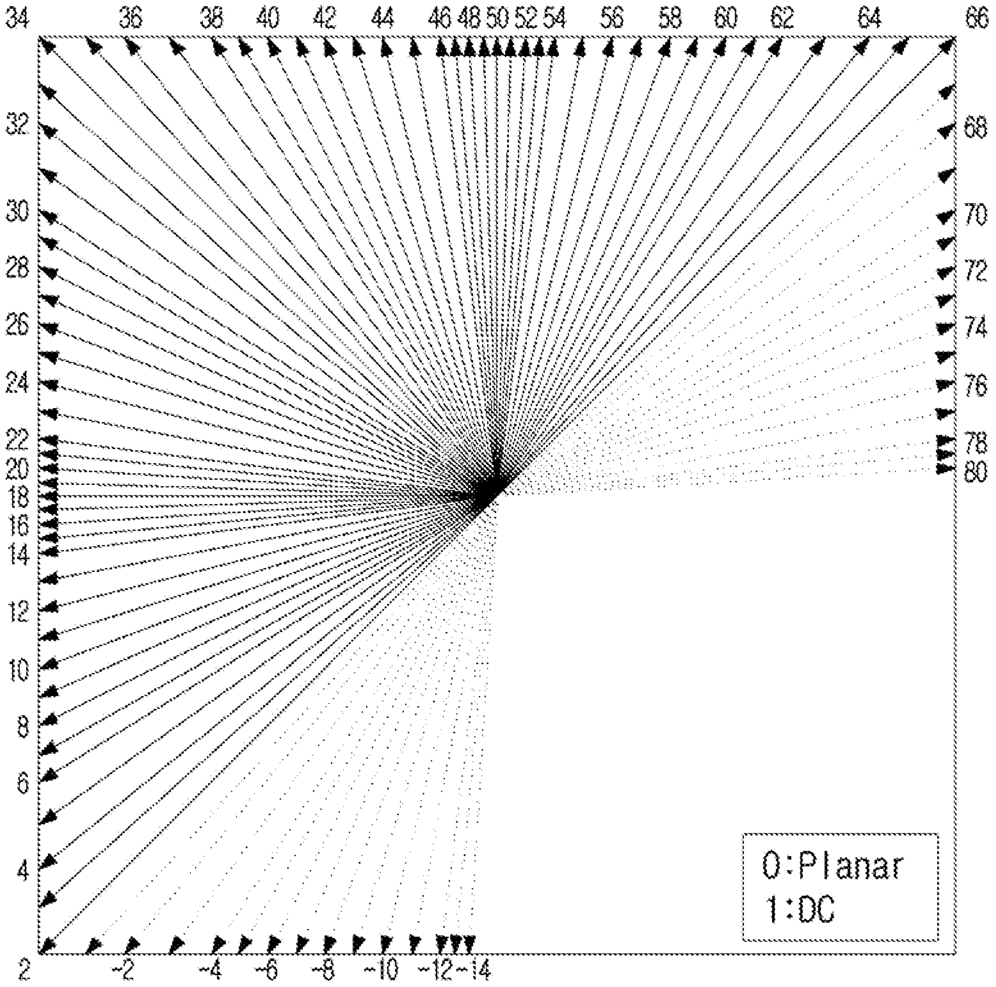
FIG. 3 shows predefined intra prediction modes.

FIG. 3 shows predefined intra prediction modes.

Intra prediction modes predefined in an encoder and a decoder may include non-directional intra prediction modes and directional prediction modes. As an example, in an example shown in FIG. 3, mode 0 represents a planar mode which is a non-directional mode and mode 1 represents a DC mode which is a non-directional mode. In addition, in an example shown in FIG. 3, 65 directional intra prediction modes (2-66) are illustrated.

More or fewer intra prediction modes than shown may be predefined in an encoder and a decoder.

One of predefined intra prediction modes may be selected and a prediction block for a current block may be obtained based on a selected intra prediction mode. In this case, the number and a position of reference samples used to generate a prediction sample within a prediction block may be adaptively determined according to a selected intra prediction mode.

Figure 4:
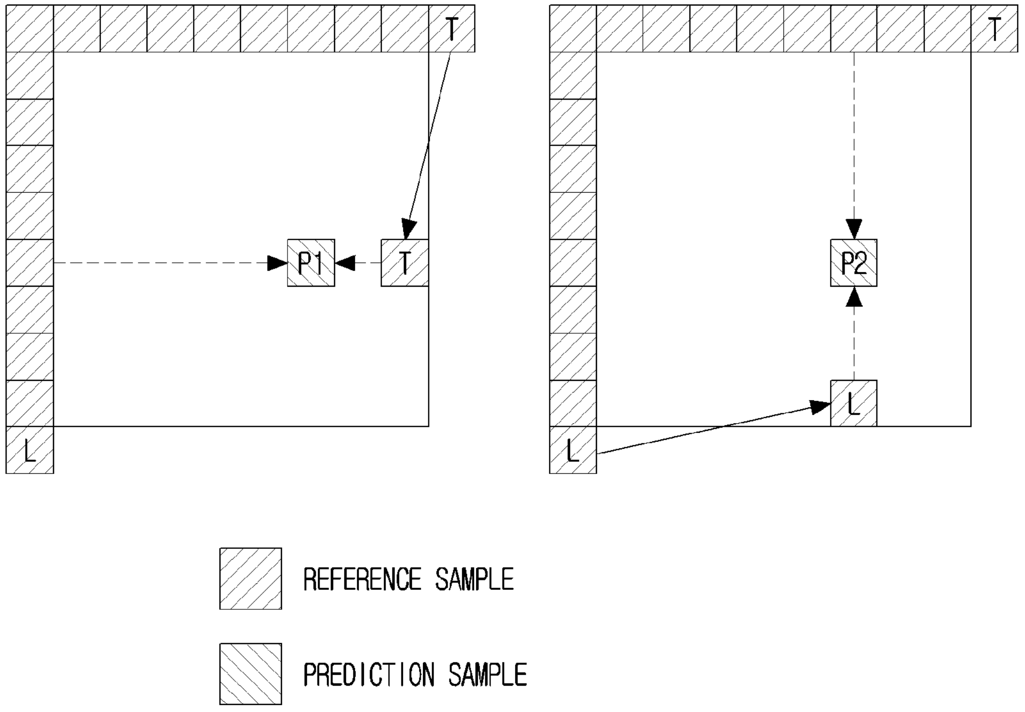
FIG. 4 shows an example in which a prediction sample is generated under a planner mode.

FIG. 4 shows an example in which a prediction sample is generated under a planner mode.

In an example shown in FIG. 4, when generating a prediction block under a planner mode, reference sample T adjacent to a top-right corner of a current block and reference sample L adjacent to a bottom-left corner may be used.

P1 represents a prediction sample in a horizontal direction and P2 represents a prediction sample in a vertical direction. P1 may be generated by linearly interpolating a reference sample having the same y coordinate as P1 (i.e., a reference sample positioned in a horizontal direction of P1) and reference sample T. P2 may be generated by linearly interpolating a reference sample having the same x coordinate as P2 (i.e., a reference sample positioned in a vertical direction of P2) and reference sample L.

Afterwards, a final prediction sample may be obtained through a weighted sum operation of horizontal directional prediction sample P1 and vertical directional prediction sample P2. Equation 1 shows an example in which a final prediction sample is generated.

$$(\alpha\times P1+\beta\times P2)/(\alpha+\beta) \quad \text{[Equation 1]}$$

In Equation 1 above, a represents a weight allocated to horizontal directional prediction sample P1 and β represents a weight allocated to vertical directional prediction sample P2. Weight a and weight β may be determined based on a width and a height of a current block. According to a width and a height of a current block, weight a and weight β may have the same value or a different value. As an example, when one side of a block is longer than the other side, a weight allocated to a prediction sample in a direction parallel to a long side may be configured to have a higher value. Alternatively, contrary to the above, a weight allocated to a prediction sample in a direction parallel to a long side may be configured to have a smaller value.

Figure 5:
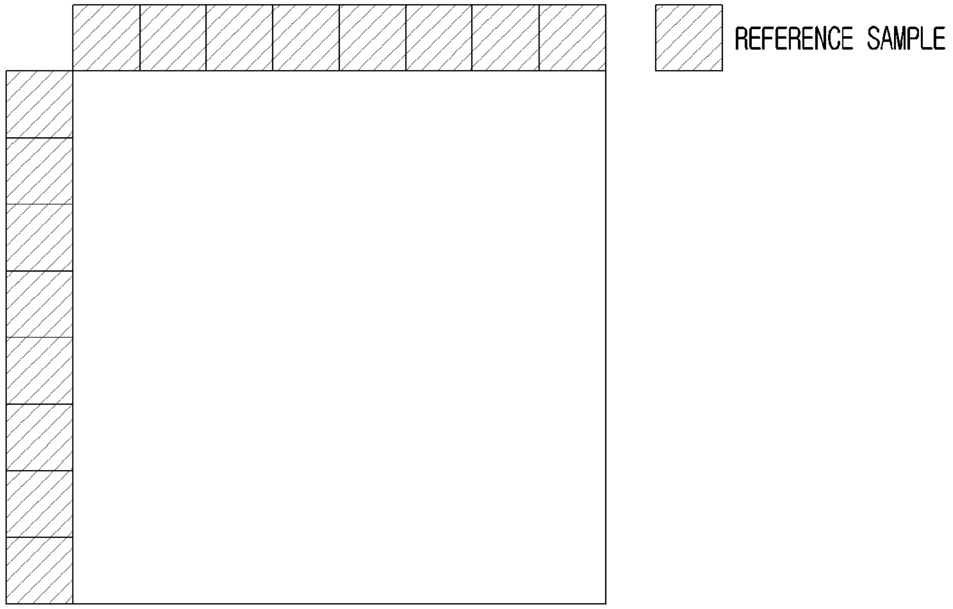
FIG. 5 shows an example in which a prediction sample is generated under a DC mode.

FIG. 5 shows an example in which a prediction sample is generated under a DC mode.

Under a DC mode, an average value of surrounding reference samples of a current block may be calculated. FIG. 5 shows a scope of reference samples used to use an average value. As in an example shown in FIG. 5, an average value may be calculated based on top reference samples and left reference samples.

According to a form of a current block, an average value may be calculated by using only top reference samples or an average value may be calculated by using only left reference samples. As an example, when a width of a current block is greater than a height or when a ratio between a width and a height of a current block is equal to or greater than (or less than) a predefined value, an average value may be calculated by using only top reference samples.

On the other hand, when a width of a current block is smaller than a height or when a ratio between a width and a height of a current block is smaller than (or greater than)

a predefined value, an average value may be calculated by using only left reference samples.

Figure 6:
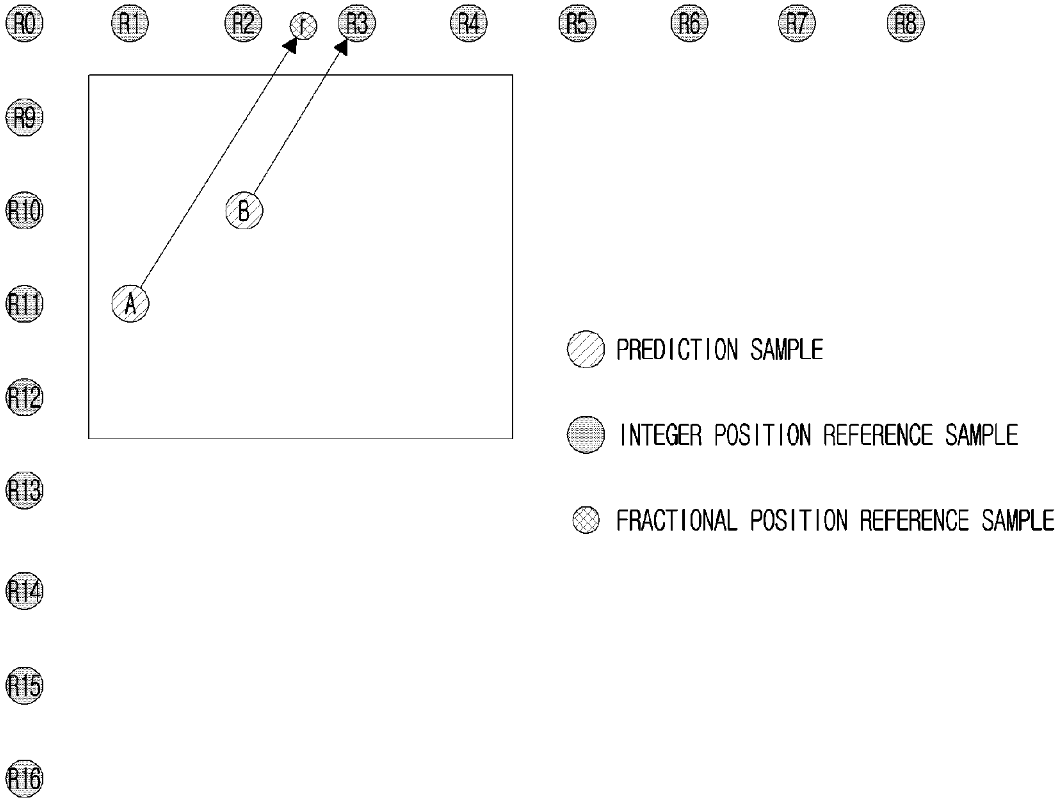
FIG. 6 shows an example in which a prediction sample is generated under a directional intra prediction mode.

FIG. 6 shows an example in which a prediction sample is generated under a directional intra prediction mode.

When a directional intra prediction mode is applied to a current block, projection may be performed to a direction on which a reference sample is placed according to an angle of a directional intra prediction mode at a position of each sample within a current block.

When a reference sample exists at a projected position (i.e., when a projected position is an integer position of a reference sample), a reference sample at a corresponding position may be configured as a prediction sample.

On the other hand, when a reference sample does not exist at a projected position (i.e., when a projected position is a fractional position of a reference sample), reference samples around a projected position may be interpolated, and an interpolated value may be configured as a prediction sample.

As an example, in an example shown in FIG. 6, when projection based on an angle of a directional intra prediction mode is performed at a position of sample B in a current block, reference sample R3 exists at a projected position. Accordingly, reference sample R3 may be configured as a prediction sample for a position of sample B.

On the other hand, when projection based on an angle of a directional intra prediction mode is performed at a position of sample A in a current block, a reference sample does not exist at a projected position. In this case, reference samples at an integer position existing around a projected position may be interpolated, and an interpolated value may be configured as a prediction sample for a position of sample A. Here, generated by interpolating reference samples at an integer position may be referred to as a reference sample at a fractional position (r in FIG. 6).

Information on an intra prediction mode of a current block may be encoded and signaled.

To this end, for a current block, an intra prediction mode list including a plurality of intra prediction mode candidates may be generated. Here, an intra prediction mode candidate may be derived based on an intra prediction mode of a neighboring block adjacent to a current block or a predefined intra prediction mode.

A flag representing whether an intra prediction mode of the current block is the same as one of a plurality of intra prediction mode candidates included in an intra prediction mode list may be explicitly encoded and signaled. When an intra prediction mode of a current block is the same as one of a plurality of intra prediction mode candidates, index information indicating one of a plurality of intra prediction mode candidates may be explicitly encoded and signaled. On the other hand, when a plurality of intra prediction mode candidates which are the same as an intra prediction mode of a current block do not exist, index information (i.e., residual mode information) indicating an intra prediction mode of a current block among the remaining intra prediction modes may be explicitly encoded and signaled.

Instead of an intra prediction mode candidate, an intra prediction mode prediction candidate may be used. In this case, a value indicated by an intra prediction mode prediction candidate may be configured as a prediction value of an intra prediction mode of a current block.

Specifically, for a current block, an intra prediction mode prediction list including a plurality of intra prediction mode prediction candidates may be configured. Here, an intra prediction mode prediction candidate may be derived based on an intra prediction mode of a neighboring block adjacent to a current block or a predefined intra prediction mode.

Afterwards, one of a plurality of intra prediction mode prediction candidates may be configured as an intra prediction mode prediction value of a current block. When an intra prediction mode prediction value is configured, a difference between an intra prediction mode of a current block and an intra prediction mode prediction value may be derived. In this case, index information indicating one of a plurality of intra prediction mode prediction candidates and information representing an intra prediction mode difference value may be explicitly encoded and signaled.

When encoding a current picture, duplicate data between pictures may be removed through inter prediction. Inter prediction may be performed in a unit of a block. Specifically, a prediction block of a current block may be generated from a reference picture by using motion information of a current block. Here, motion information may include at least one of a motion vector, a reference picture index and a prediction direction.

Motion information of a current block may be generated through motion estimation.

Figure 7:
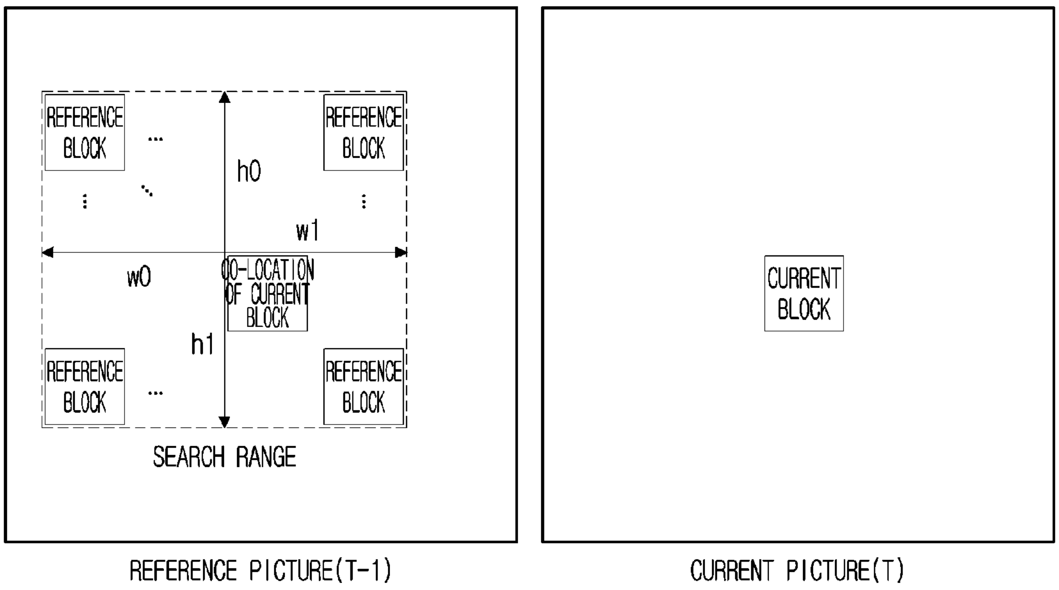
FIG. 7 shows an example in which motion estimation is performed.

FIG. 7 shows an example in which motion estimation is performed.

In FIG. 7, it is assumed that Picture Order Count (POC) of a current picture is T and POC of a reference picture is (T−1).

A search range for motion estimation may be configured from the same position as a reference point of a current block in a reference picture. Here, reference point may be a position of a top-left sample of a current block.

As an example, in FIG. 7, it is illustrated that based on a reference point, a quadrangle in a size of (w0+w01) and (h0+h1) is configured as a search range. In the example, w0, w1, h0 and h1 may have the same value. Alternatively, at least one of w0, w1, h0 and h1 may be configured to have a different value from the other. Alternatively, a size of w0, w1, h0 and h1 may be determined not to exceed a coding tree unit (CTU) boundary, a slice boundary, a tile boundary or a picture boundary.

After configuring reference blocks with the same size as a current block within a search range, a cost with a current block may be measured for each reference block. A cost may be calculated by using similarity between two blocks.

As an example, a cost may be calculated based on a sum of absolute values of difference values between original samples in a current block and original samples (or reconstructed samples) in a reference block. As a sum of absolute values is smaller, a cost may be reduced.

Afterwards, after comparing a cost of each reference block, a reference block with an optimal cost may be configured as a prediction block of a current block.

And, a distance between a current block and a reference block may be configured as a motion vector. Specifically, a x-coordinate difference and a y-coordinate difference between a current block and a reference block may be configured as a motion vector.

Furthermore, an index of a picture including a reference block specified through motion estimation is configured as a reference picture index. In addition, according to an inter prediction mode, a reference picture index indicating one of reference pictures may be encoded and signaled. As an example, when a plurality of reference pictures exist in a reference picture list and motion estimation is performed for each of a plurality of reference pictures, a reference picture index for specifying a reference picture that motion information of a current block is derived among the plurality of reference pictures may be explicitly encoded and signaled to a decoder. In this case, when only one reference picture is included in a reference picture list, encoding/decoding of the reference picture index may be omitted.

In addition, a prediction direction may be configured based on whether a reference picture belongs to a L0 reference picture list or belongs to a L1 reference picture list.

In addition, motion estimation may be performed for each of a L0 direction and a L1 direction. When prediction is performed for both a L0 direction and a L1 direction, motion information in a L0 direction and motion information in a L1 direction may be generated, respectively.

Figure 8:
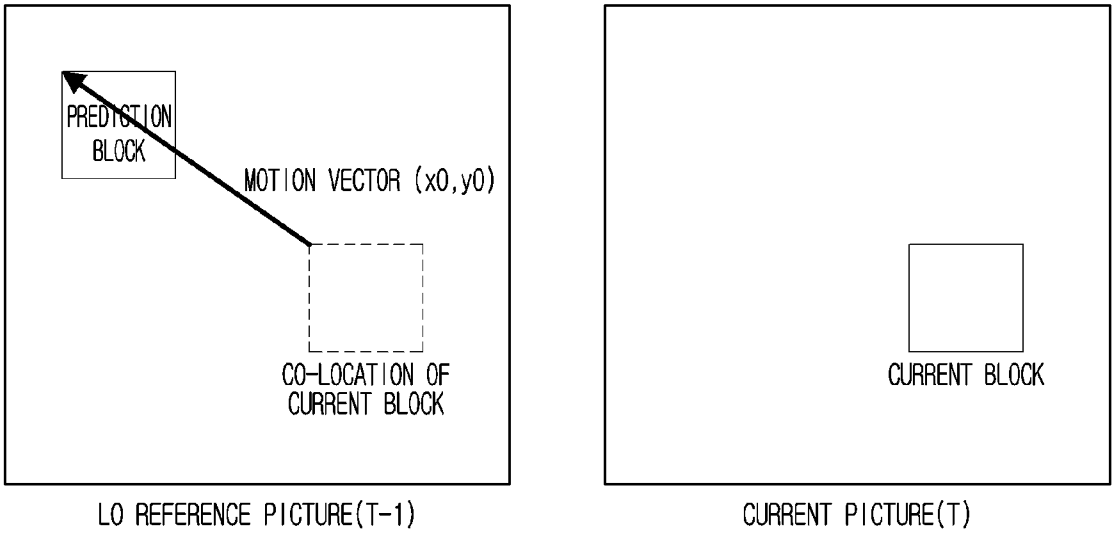
FIGS. 8 and 9 show an example in which a prediction block of a current block is generated based on motion information generated through motion estimation.
Figure 9:
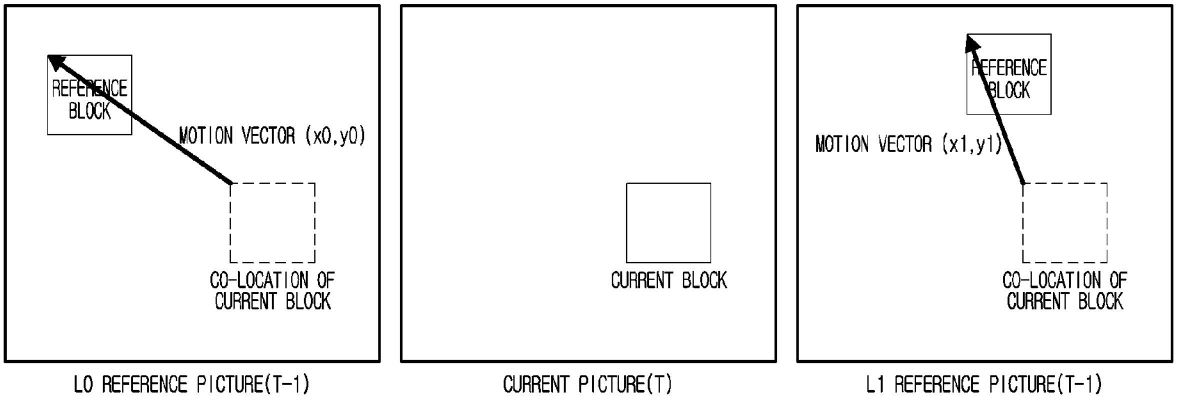

FIGS. 8 and 9 show an example in which a prediction block of a current block is generated based on motion information generated through motion estimation.

FIG. 8 shows an example in which a prediction block is generated through unidirectional (i.e., L0 direction) prediction, and FIG. 9 shows an example in which a prediction block is generated through bidirectional (i.e., L0 and L1 direction) prediction.

For unidirectional prediction, a prediction block of a current block is generated by using one motion information. As an example, the motion information may include a L0 motion vector, a L0 reference picture index and prediction direction information indicating a L0 direction.

For bidirectional prediction, a prediction block is generated by using two motion information. As an example, a reference block in a L0 direction specified based on motion information on a L0 direction (L0 motion information) may be configured as a L0 prediction block, and a reference block in a L1 direction specified based on motion information on a L1 direction (L1 motion information) may be configured as a L1 prediction block. Afterwards, a prediction block of a current block may be generated by performing a weighted sum for a L0 prediction block and a L1 prediction block.

In an example shown in FIGS. 7 to 9, it was illustrated that a L0 reference picture exists in a direction before a current picture (i.e., a POC value is smaller than a current picture) and a L1 reference picture exists in a direction after a current picture (i.e., a POC value is larger than a current picture).

However, unlike an example shown, a L0 reference picture may exist in a direction after a current picture or a L1 reference picture may exist in a direction before a current picture. As an example, both a L0 reference picture and a L1 reference picture may exist in a direction before a current picture or both may exist in a direction after a current picture. Alternatively, bidirectional prediction may be performed by using a L0 reference picture that exists in a direction after a current picture and a L1 reference picture that exists in a direction before a current picture.

Motion information of a block that inter prediction was performed may be stored in a memory. In this case, motion information may be stored in a unit of a sample. Specifically, motion information of a block to which a specific sample belongs may be stored as motion information of a specific sample. Stored motion information may be used to derive motion information of a neighboring block to be encoded/decoded later.

An encoder may signal to a decoder information obtained by encoding a residual sample corresponding to a difference value between a sample of a current block (i.e., an original sample) and a prediction sample and motion information necessary to generate a prediction block. A decoder may decode information on a signaled difference value to derive a difference sample and add a prediction sample within a prediction block generated by using motion information to the difference sample to generate a reconstructed sample.

In this case, in order to effectively compress motion information signaled to a decoder, one of a plurality of inter prediction modes may be selected. Here, a plurality of inter prediction modes may include a motion information merge mode and a motion vector prediction mode.

A motion vector prediction mode is a mode in which a difference value between a motion vector and a motion vector prediction value is encoded and signaled. Here, a motion vector prediction value may be derived based on motion information of a surrounding sample or a surrounding block adjacent to a current block.

A motion information merge mode is a mode that configures motion information of a current block to be the same as motion information of a neighboring block. In a motion information merge mode, motion information may be encoded/decoded by using a motion information merge list.

An encoder generates a residual block by subtracting a prediction block from an original block. Afterwards, whether to perform transform may be determined for residual values existing in a residual block, i.e., residual samples. According to the determination, a residual coefficient may be generated by performing quantization for residual samples that transform was not performed or transform coefficients generated as a result of transform. Here, a residual coefficient may refer to at least one of a quantized transform coefficient or a quantized residual sample according to whether to apply transform. A residual coefficient may be also referred to as a residual signal. Afterwards, encoding may be performed for each residual coefficient.

In a decoder, a residual sample may be reconstructed through an reverse process of an encoder. Specifically, after obtaining a residual coefficient, dequantization may be performed for an obtained residual coefficient. Afterwards, a residual sample may be obtained by performing inverse transform for a dequantized residual coefficient or omitting inverse transform. Encoding of a residual coefficient may be performed based on at least one syntax element.

First, a flag representing whether a non-zero residual coefficient exists in a current block may be encoded and signaled. When there is a non-zero residual coefficient in a current block, a position of a last non-zero residual coefficient in scan order may be encoded.

In addition, a sub-block flag representing whether there is a non-zero residual coefficient in a sub-block may be encoded in a unit of a sub-block within a current block. When there is a non-zero residual coefficient in a sub-block, information on each residual coefficient may be additionally encoded according to scan order.

In this case, for a sub-block whose scan order is earlier than a sub-block including a last non-zero residual coefficient, encoding of a sub-block flag may be omitted. Since the sub-block does not include a non-zero residual coefficient, a value of a sub-block flag may be considered as 0.

In addition, for a sub-block including a last non-zero residual coefficient, encoding of a sub-block flag may be omitted. Since the sub-block necessarily includes a non-zero residual coefficient, a value of a sub-block flag may be considered as 1.

As another example, encoding of position information of a last non-zero residual coefficient may be omitted. When encoding of position information of a last non-zero residual coefficient is omitted, a sub-block flag may be encoded for all sub-blocks in a current block.

In this case, when it is determined that a non-zero residual coefficient is not included in the remaining sub-blocks excluding a sub-block whose scan order is last, it may be understood that a non-zero residual coefficient is necessarily included in a last sub-block. Accordingly, encoding of a sub-block flag may be omitted for a last sub-block and its value may be considered to be 1.

Information representing whether position information of a last non-zero coefficient was encoded may be additionally encoded. When position information of a last non-zero coefficient is encoded, a value of the information may be configured as 1. In this case, a sub-block flag may be encoded from a sub-block that a last non-zero coefficient exists. On the other hand, when position information of a last non-zero coefficient is not encoded, a value of the information may be configured as 0. In this case, a sub-block flag may be encoded from a sub-block whose scan order is first.

When a non-zero residual coefficient exists in a current block, it may be assumed that for a first sub-block within the current block, a non-zero residual coefficient is necessarily included. Accordingly, encoding of a sub-block flag representing whether a non-zero residual coefficient exists may be omitted for a first sub-block.

Information for encoding a residual coefficient may include at least one of a flag representing whether a residual coefficient has a non-zero value, information representing a size of a residual coefficient and information representing a sign of a residual coefficient.

Residual coefficients may be encoded according to predetermined scan order. In this case, encoding order of residual coefficients may be different based on whether transform was skipped in a current block. As an example, when transform is not skipped in a current block, a residual coefficient at a bottom-right position of a sub-block may be encoded first and a residual coefficient at a top-left position may be encoded last. In other words, scan order between residual coefficients may be determined according to inverse-diagonal scan, inverse-horizontal scan or inverse-vertical scan. On the other hand, when transform is skipped in a current block, a residual coefficient at a top-left position of a sub-block may be encoded first and a residual coefficient at a bottom-right position may be encoded last. In other words, scan order between residual coefficients may be determined according to diagonal scan, horizontal scan or vertical scan.

Alternatively, even when transform is skipped in a current block, scan order between residual coefficients may be determined according to inverse-diagonal scan, inverse-horizontal scan or inverse-vertical scan.

Scan order of residual coefficients may be predefined in an encoder and a decoder. Alternatively, information representing scan order of residual coefficients may be encoded and signaled. Alternatively, scan order may be determined based on at least one of a size and a shape of a current block, an intra prediction mode, whether transform was skipped or whether second transform was performed. As an example, when transform is skipped in a current block, residual coefficients may be encoded/decoded according to diagonal (or inverse diagonal) scan order, and when transform is not skipped in a current block, residual coefficients may be encoded/decoded according to inverse diagonal (or diagonal) scan order.

Figure 10:
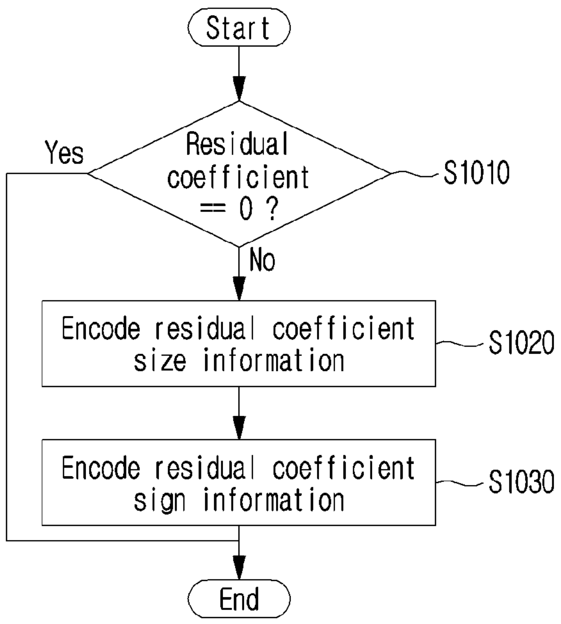
FIG. 10 is a flowchart showing a process of encoding a residual coefficient in an encoder.

FIG. 10 is a flowchart showing a process of encoding a residual coefficient in an encoder.

Figure 11:
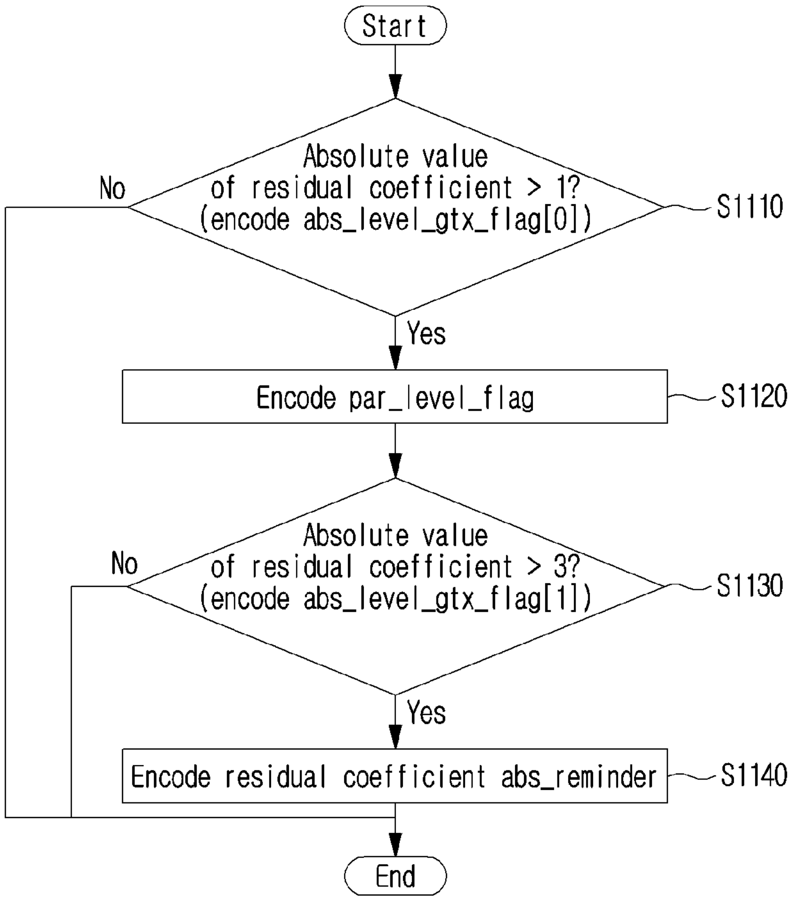
FIG. 11 is a flowchart showing an encoding process of size information of a residual coefficient.

First, sig_coeff_flag, a flag representing whether a residual coefficient has a non-zero value, may be encoded S1010. When a value of a residual coefficient is 0, encoding may be performed by configuring a value of a flag, sig_coeff flag, as 0. On the other hand, when a value of a residual coefficient is not 0, encoding may be performed by configuring a value of a flag, sig_coeff_flag, as 1. When a value of a residual coefficient is not 0, size information of a residual coefficient may be further encoded S1020. FIG. 11 is a flowchart showing an encoding process of size information of a residual coefficient.

An absolute value of a residual coefficient may be encoded by using at least one abs_level gtx flag[N]. Here, N may be an integer equal to or greater than 0. A flag abs level gtx flag[N] may represent whether an absolute value of a residual coefficient has a value greater than (2N+1). The number of abs level gtx flag[N] used to encode an absolute value of a residual coefficient may be determined based on whether transform was skipped in a current block. As an example, when transform is not skipped in a current block, two abs level_gtx_flag[N] (N is 0 to 1) may be used. On the other hand, when transform is skipped in a current block, at least three abs_level_gtx_flag[N] (e.g., 3, 4 or 5) may be used. In this embodiment, it is assumed that two abs_level_gtx_flag[N] are used. A flag abs_level_gtx_flag[0] representing whether an absolute value of a residual coefficient is greater than 1 may be encoded S1110. When an absolute value of a residual coefficient is 1, encoding may be performed by setting a value of a flag abs_level_gtx flag[0] as 0. On the other hand, when an absolute value of a residual coefficient is greater than 1, encoding may be performed by setting a value of a flag abs_level_gtx flag[0] as 1.

When an absolute value of a residual coefficient is greater than 1, par_level_flag, a flag representing whether an absolute value of a residual coefficient is an even number or an odd number, may be encoded S1120. When an absolute value of a residual coefficient is an even number, encoding may be performed by setting a flag par_level_flag as 0. On the other hand, when an absolute value of a residual coefficient is an odd number, encoding may be performed by setting a flag par_level_flag as 1. Alternatively, conversely, when an absolute value of a residual coefficient is an even number, a flag par_level_flag may be set as 1, and when an absolute value of a residual coefficient is an odd number, a flag par_level_flag may be set as 0.

Next, abs_level_gtx_flag[1], a flag representing whether an absolute value of a residual coefficient is greater than 3, may be encoded S1130. When an absolute value of a residual coefficient is less than or equal to 3, a value of a flag abs_level_gtx_flag[1] may be set as 0. On the other hand, when an absolute value of a residual coefficient is greater than 3, a value of a flag abs_level_gtx_flag[1] may be set as 1.

When an absolute value of a residual coefficient is greater than 3, abs_remainder representing a residual size may be encoded S1140. A syntax abs remainder may be derived by shifting a value derived by subtracting 4 from an absolute value of a residual coefficient by 1 to the right.

In addition to a flag, the abs_level_gtx_flag[0] and abs_level_gtx_flag[1], shown in FIG. 11, abs_level_gtx_flag[N] such as abs_level_gtx_flag[2], abs_level_gtx_flag[3] or abs_level_gtx_flag[4], etc. may be additionally encoded. In this case, a flag, abs_level_gtx_flag[N], may be additionally encoded/decoded only when a value of abs_level gtx flag[N−1] is 1.

abs_level_gtx_flag[N] may represent whether an absolute value of a residual coefficient has a value greater than (2N+1). When abs level_gtx_flag[N] is used, abs remainder may be derived by shifting a value derived by subtracting 2 (N+1) from an absolute value of a residual coefficient by 1 to the right.

In the above-described example, it was illustrated that an absolute value of a residual coefficient is encoded by using sig_coeff flag, abs_level_gtx_flag[0], par_level_flag, abs_level_gtx flag[1] and abs reminder. As another example, an absolute value of a residual coefficient may be encoded as it is. As an example, dec_abs_level, a syntax representing an absolute value of a residual coefficient, may be encoded. A method of selecting an encoding method for an absolute value of a residual coefficient is described later.

After encoding size information of a residual coefficient, coeff_sign_flag, a flag representing a sign of a residual coefficient, may be encoded S1030. When a value of a flag coeff_sign_flag is 0, it represents that a residual coefficient is a positive number. On the other hand, when a value of a flag coeff_sign_flag is 1, it represents that a residual coefficient is a negative number.

Figure 12:
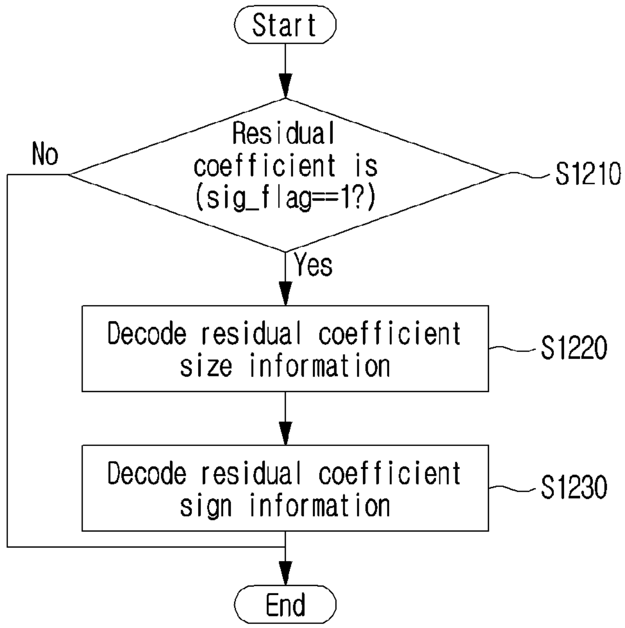
FIG. 12 is a flowchart showing a process of decoding a residual coefficient in a decoder.

FIG. 12 is a flowchart showing a process of decoding a residual coefficient in a decoder.

If it is determined that a non-zero residual coefficient is included in a sub-block, residual coefficients may be reconstructed based on predetermined scan order.

First, sig_coeff_flag, a flag representing whether a residual coefficient has a non-zero value, may be decoded S1210. When a value of a flag sig_coeff flag is 0, it represents that a value of a residual coefficient is 0. On the other hand, when a value of a flag sig_coeff_flag is 1, it represents that a value of a residual coefficient is not 0. When a value of a flag sig_coeff_flag is 1, size information of a residual coefficient may be further decoded S1220.

Figures 13, 14:
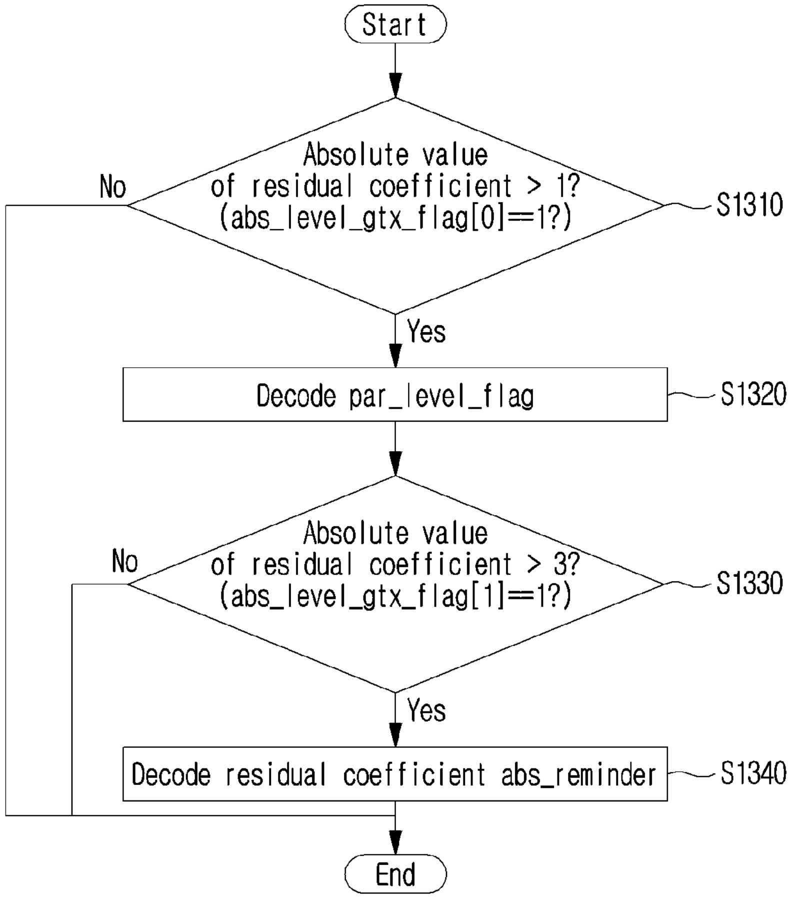
FIG. 13 is a diagram showing a decoding process of size information of a residual coefficient.
FIGS. 14 and 15 are for describing an example in which a residual coefficient is encoded/decoded.

FIG. 13 is a diagram showing a decoding process of size information of a residual coefficient.

For convenience of a description, it is assumed that a residual coefficient is encoded by using to two up abs_level_gtx_flag[N].

abs_level_gtx_flag[0], a flag representing whether an absolute value of a residual coefficient is greater than 1, may be decoded S1310. When a value of a flag abs_level_gtx_flag[0] is 0, it represents that an absolute value of a residual coefficient is 1. On the other hand, when a value of a flag abs_level_gtx_flag[0] is 1, it represents that an absolute value of a residual coefficient is greater than 1.

When a value of a flag abs_level_gtx_flag[0] is 1, par_level_flag, a flag representing whether an absolute value of a residual coefficient is even or odd, may be decoded S1320. When a value of a flag par_level_flag is 0, it represents that an absolute value of a residual coefficient is an even number, and when a value of a flag par_level_flag is 1, it represents that an absolute value of a residual coefficient is an odd number.

Next, abs level_gtx_flag[1], a flag representing whether an absolute value of a residual coefficient is greater than 3, may be decoded S1330. When a value of a flag abs_level_gtx_flag[1] is 0, it represents that an absolute value of a residual coefficient is less than 3. When a value of a flag abs level gtx flag[1] is 0, an absolute value of a residual coefficient may be determined to be 2 or 3 according to a value of a flag par_level_flag.

When a value of a flag abs_level_gtx_flag[1] is 1, it represents that an absolute value of a residual coefficient is greater than 3.

When a value of a flag abs_level_gtx_flag[1] is 1, abs reminder representing the remaining size may be decrypted S1340. An absolute value of a residual coefficient may be derived by adding 3 or 4 to a value derived by shifting a value represented by a syntax abs_reminder by 1 to the left.

In addition to a flag abs_level_gtx_flag[0] and abs_level_gtx_flag[1] shown in FIG. 13, abs level gtx flag[N] such as abs_level_gtx_flag[2], abs_level_gtx_flag[3] or abs_level_gtx_flag[4] may be additionally decoded. In this case, when a value of abs_level_gtx_flag[N] is 1, abs_level_gtx_flag[N+1] may be additionally decoded.

abs_level_gtx_flag[N] may represent whether an absolute value of a residual coefficient has a value greater than (2N+1). When abs_level_gtx_flag[0] is used, abs reminder may be set as a value derived by shifting a value derived by subtracting 2 (N+1) from an absolute value of a residual coefficient by 1 to the right.

In an example described above, it was illustrated that an absolute value of a residual coefficient is decoded by using sig_coeff_flag, abs_level_gtx_flag[0], par_level_flag, abs_level gtx flag[1] and abs_reminder. As another example, an absolute value of a residual coefficient may be decoded as it is. As an example, dec_abs_level, a syntax representing an absolute value of a residual coefficient, may be decoded. A method of selecting a method for decoding an absolute value of a residual coefficient is described later.

After decoding size information of a residual coefficient, coeff_sign_flag, a flag representing a sign of a residual coefficient, may be decoded S1230. When a value of a flag coeff_sign_flag is 0, it represents that a residual coefficient is a positive number. On the other hand, when a value of a flag coeff_sign_flag is 1, it represents that a residual coefficient is a negative number.

As described, a residual coefficient may be encoded by at least one syntax. Through a binarization process of syntax(s), a residual coefficient may be changed into multiple bins, and changed bins may be encoded through entropy encoding.

Entropy encoding may be divided into encoding using context information and encoding not using context information. A context represents a probability that a value of a bin is 0 or 1. Here, an encoding/decoding method using context information may be referred to as context coding, and an encoding/decoding method not using context information may be referred to as bypass coding.

In order to increase the throughput of an entropy encoding unit 165 and an entropy decoding unit 210, the number of bins encoded by using context information may be limited. To limit the number of bins encoded by using context information, a threshold value may be set. A threshold value may be also referred to as a coded context bin (CCB). Among generated bins, a bin whose count value is smaller than a threshold value is encoded by using context information. If a count value is equal to or exceeds a threshold value, encoding using context information may no longer be used.

A threshold value may be determined adaptively in an encoder/decoder. As an example, a threshold value may be determined based on at least one of a size and a shape of a current block, the number of non-zero residual coefficients in a current block, whether transform is skipped in a current block, a type of a transform kernel applied to a current block, whether quantization is applied to a current block, a color component (e.g., Y, Cb, Cr), a quantization parameter of a current block or a bit depth.

As an example, a threshold value may be determined based on the number of non-zero residual coefficients in a current block. Specifically, a value obtained by multiplying the number of non-zero residual coefficients in a current block by a real number or a value obtained by adding or subtracting an offset may be set as a threshold value.

As an example, a threshold value may be determined based on the number of samples included in a current block. Specifically, a value obtained by multiplying the number of samples in a current block by a real number or a value obtained by adding or subtracting an offset may be set as a threshold value.

As an example, a threshold value may be determined based on at least one of a size or a shape of a current block. Specifically, at least one threshold value candidate may be predefined per size and/or shape of a block. In this case, a threshold value candidate of a current block may be selected from at least one threshold value candidate corresponding to a size and/or a shape of a current block. If a plurality of threshold value candidates correspond to a size and/or a shape of a current block, index information for specifying one of a plurality of threshold value candidates may be additionally encoded/decoded.

As an example, a threshold value may be determined based on at least one of whether transform skip was applied, a transform kernel applied to a current block or a quantization parameter.

Alternatively, information representing a threshold value may be signaled through a bitstream. The information may be encoded through a higher header such as a sequence, a picture header or a slice header.

Alternatively, in an encoder/a decoder, a threshold value may be fixed.

As described above, according to whether transform was skipped in a current block, at least one of scan order for encoding/decoding of a residual coefficient, the number of gt_N_flag or the number of bins to be encoded/decoded by using context information (i.e., a threshold value) may be different. When transform is applied to a current block (i.e., when transform is not skipped), encoding/decoding a residual coefficient may be referred to as a residual coding (RC) method. On the other hand, when transform is not applied to a current block (i.e., when transform is skipped), encoding/decoding a residual coefficient may be referred to as a Transform Skip Residual Coding (TSRC) method. Hereinafter, a method for encoding a residual coefficient in a RC method and a TSRC method is described in detail.

Figure 15:
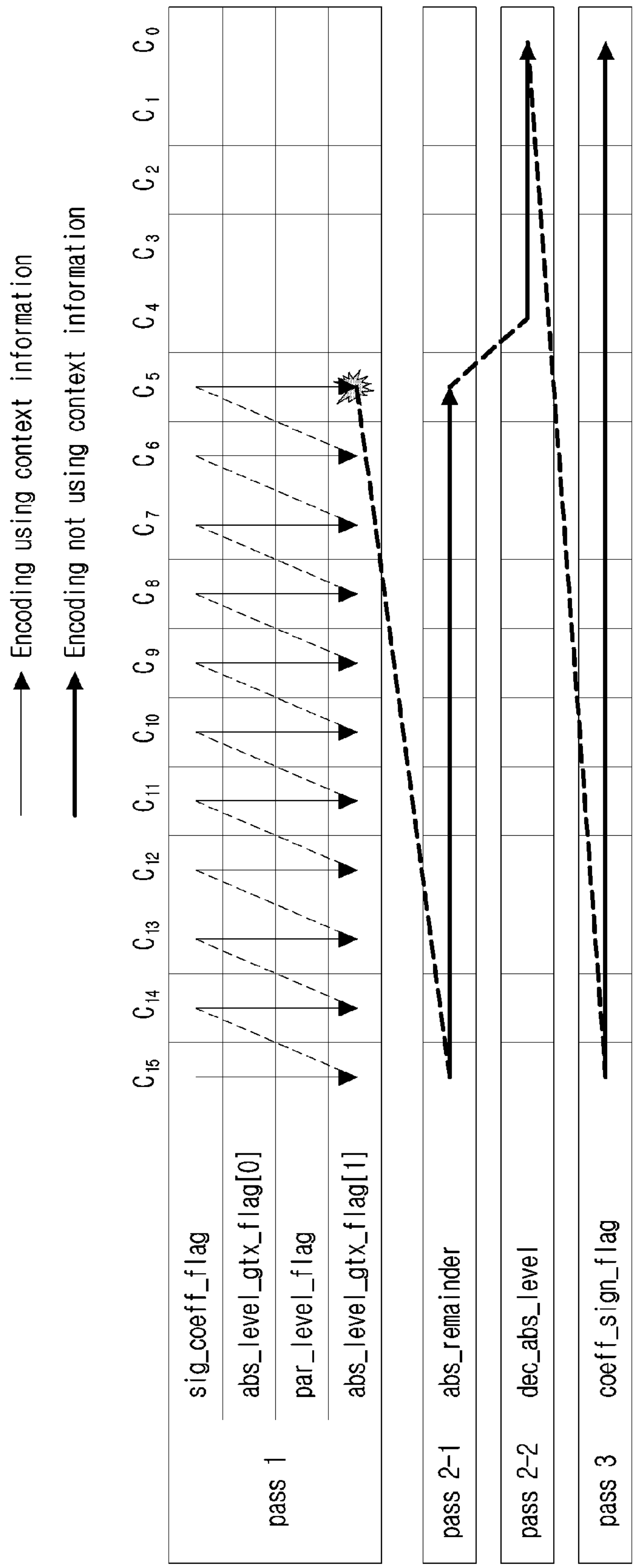

FIGS. 14 and 15 are for describing an example in which a residual coefficient is encoded/decoded.

FIG. 14 shows an example in which a different identifier is allocated to each residual coefficient in a 4×4 block. FIG. 15 shows encoding order of syntax elements for each residual coefficient shown in FIG. 14. In this example, it is assumed that residual coefficient encoding in a RC method is applied.

In addition, it is assumed that the maximum number (i.e., a threshold value) of bins to be decoded/decoded by using context information is 44.

When a RC method is applied, a residual coefficient may be encoded/decoded in an inverse diagonal scan direction from a bottom-right residual coefficient within a sub-block to a top-left residual coefficient. In FIG. 14, $C_{15}$ represents a residual coefficient at a bottom-right position in a sub-block, and Co represents a residual coefficient at a top-left position in a sub-block.

In addition, in FIG. 15, an arrow with a thin solid line represents bins that are encoded/decoded by context information, and an arrow with a thick solid line represents bins that are encoded/decoded without using context information. In addition, a connecting line between arrows represents encoding/decoding order of each syntax.

Under a RC method, up to two abs_level_gtx_flag[N] may be used.

Table 1 uses a formula to define syntaxes used to encode/decode a residual coefficient under a RC method.

TABLE 1

| Pass | Syntax Name | Formula |
|---|---|---|
| pass 1 | sig_coeff_flag | $C_N$ != 0 |
| | abs_level_gtx_flag[0] | !! ( $\lvert C_N \rvert$ − 1 ) |
| | par_level_flag | ( $\lvert C_N \rvert$ − 2 ) & 1 |
| | abs_level_gtx_flag[1] | ( $\lvert C_N \rvert$ − 2 ) >> 1 |
| pass 2-1 | abs_remainder | ( $\lvert C_N \rvert$ − 4 ) >> 1 |
| pass 2-2 | dec_abs_level | $\lvert C_N \rvert$ |
| pass 3 | coeff_sign_flag | $C_N$ < 0 ? 1 : 0 |

Table 2 represents a value of each syntax when a value of residual coefficient $C_{15}$ is (−21).

TABLE 2

| Pass | Syntax Name | Formula |
|---|---|---|
| pass 1 | sig_coeff_flag | 1 |
| | abs_level_gtx_flag[0] | 1 |
| | par_level_flag | 1 |
| | abs_level_gtx_flag[1] | 1 |
| pass 2-1 | abs_remainder | 8 |
| pass 2-2 | dec_abs_level | — |
| pass 3 | coeff_sign_flag | 1 |

Table 3 represents a process in which a residual coefficient is reconstructed in a decoder.

TABLE 3

| | Formula |
|---|---|
| $TmpC_N$ | sig_coeff_flag + abs_level_gtx_flag[0] + par_level_flag + (abs_level_gtx_flag[1]<<1) |
| $\lvert C_N \rvert$ | $TmpC_N$ + (abs_remainder<<1) |

In Table variable $TmpC_N$ represents a temporary reconstructed coefficient in a state where a value of abs_remainder is not reflected. If a syntax abs remainder does not or exist (e.g., when abs_level_gtx_flag[0] abs_level_gtx_flag [1] is 0), a temporary reconstructed coefficient $TmpC_N$ may be set as an absolute value of a residual coefficient. On the other hand, if a syntax abs remainder exists (e.g., when abs_level_gtx_flag[1] is 1), an absolute value of a residual coefficient may be derived by adding a value derived by abs remainder (specifically, a value derived by shifting abs remainder by 1 to the left) to a temporary reconstructed coefficient $TmpC_N$. As an example, referring to an example in Table 2, a value of a variable $TmpC_{15}$ for a residual coefficient $C_{15}$ may be derived as 5 (specifically, 1+1+1+(1<<1)). In addition, an absolute value $\lvert C_{15} \rvert$ for a residual coefficient $C_{15}$ may be derived as 21 by adding a value derived by shifting abs_remainder by 1 to the left (i.e., 16) to a temporary residual coefficient $TmpC_{15}$ (i.e., 5). Afterwards, through a value of coeff_sign_flag, a value of a residual coefficient $C_{15}$ may be finally reconstructed to −21.

Pass represents encoding order and decoding order. As an example, a decoder may decode all syntaxes belonging to 1 pass and then decode syntaxes belonging to 2 pass. In addition, after decoding all syntaxes belonging to 2 pass, syntaxes belonging to 3 pass may be decoded.

In an example shown, 2-2 pass represents an alternative path to 1 pass, 2-1 pass and 3 pass.

If a coefficient of a bin encoded by using context information is smaller than a threshold value, an absolute value of a residual coefficient may be encoded through 1 pass and 2-1 pass. On the other hand, if a coefficient of a bin encoded by using context information is equal to or greater than a threshold value, an absolute value of a residual coefficient may be encoded through 2-2 pass.

As an example, a residual coefficient $C_{15}$ which is encoded/decoded by using context information may be encoded/decoded by using at least one of syntax elements belonging to 1 pass, 2-1 pass and 3 pass.

On the other hand, a residual coefficient $C_5$ which is encoded/decoded without using context information may be encoded/decoded by using syntax elements belonging to 2-2 pass and 3-pass.

Specifically, for a residual coefficient encoded/decoded by using context information, first, whether a residual coefficient has a non-zero value may be determined through sig_coeff_flag. Since a residual coefficient Cis is −21, sig_coeff_flag is set as 1.

Next, if sig_coeff_flag is 1, abs_level_gtx_flag[0] is additionally encoded/decoded. In this case, if an absolute value of a residual coefficient is greater than 1, abs_level_gtx_flag [0] may be set as 1, and par_level_flag and abs_level_gtx_flag[1] may be additionally encoded/decoded. Since an absolute value of a residual coefficient $C_{15}$ is 21, abs_level_gtx_flag[0] for $C_{15}$ is set as 1, and for Cis, par_level_flag and abs_level_gtx_flag[1] are additionally encoded/decoded.

If an absolute value of a residual coefficient is greater than 3, abs_level_gtx_flag[1] may be set as 1, and if abs_level_gtx_flag[1] is 1, abs_remainder, a syntax derived by shifting a value obtained by subtracting 4 from an absolute value of a residual coefficient by 1 to the right, may be additionally encoded/decoded. Since an absolute value of a residual coefficient $C_{15}$ is 21, abs_level_gtx_flag[1] is set as 1, and abs_remainder is additionally encoded/decoded.

Afterwards, a sign of a residual coefficient may be encoded/decoded by using coeff_sign_flag representing a sign of a residual coefficient $C_{15}$.

On the other hand, when a residual coefficient is encoded/decoded without using context information, dec_abs_level, a syntax representing an absolute value of a residual coefficient, may be encoded/decoded without encoding/decoding syntax elements listed above. As an example, for $C_5$, only dec_abs_level representing an absolute value of $C_5$ and coeff_sign_flag representing a sign of Cs may be encoded/decoded.

According to an example shown in FIG. 15, coeff_sign_flag, a syntax representing a sign of a residual coefficient, is always encoded/decoded without using context information, regardless of whether the number of bins encoded/decoded by using context information exceeds a threshold value. However, as above, when encoding/decoding not using context information is applied, a problem may occur that reduces encoding/decoding efficiency for the entire image. In addition, encoding/decoding a sign for all residual coefficients results in an increase in the number of signaling bits. Accordingly, in the present disclosure, instead of explicitly encoding and signaling a sign of a residual coefficient, a method of predicting a sign of a residual value and encoding information representing whether it matches a predicted sign by using context information is proposed.

Figure 16:
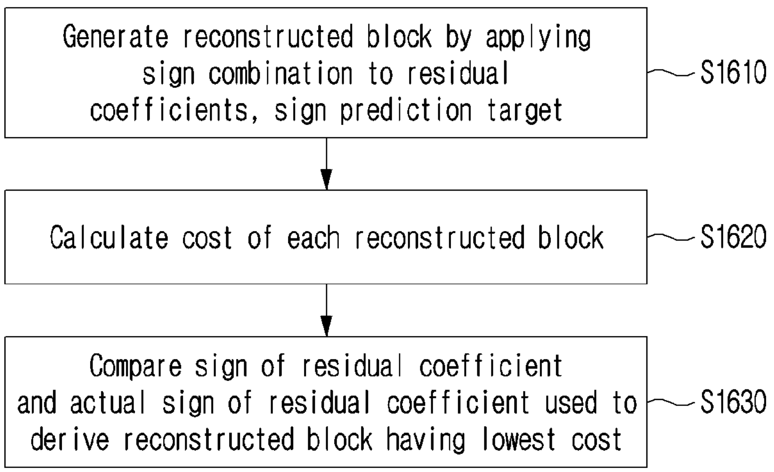
FIGS. 16 and 17 are a flowchart of a method for predicting a sign of a residual coefficient according to an embodiment of the present disclosure.
Figure 17:
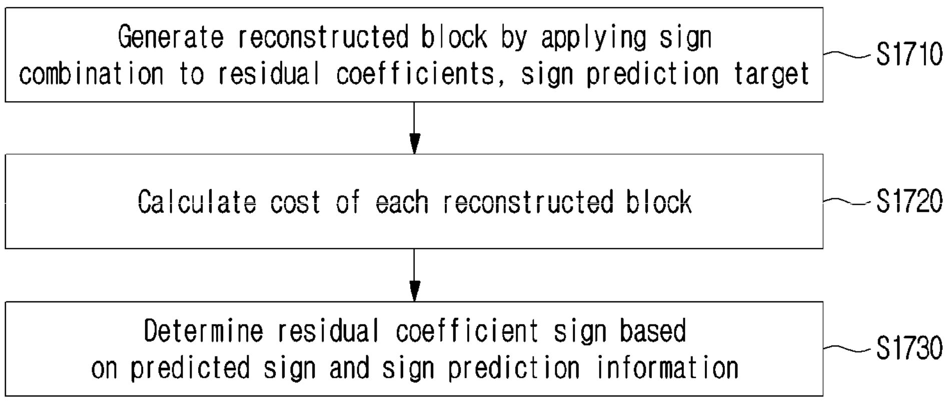

FIGS. 16 and 17 are a flowchart of a method for predicting a sign of a residual coefficient according to an embodiment of the present disclosure.

FIG. 16 shows an operation of an encoder, and FIG. 17 shows an operation of a decoder.

In an encoder, at least one of the number or a position of residual coefficients which will predict a sign may be determined. In this case, sign prediction information for specifying at least one of the number or a position of residual coefficients to which sign prediction is applied may be encoded and signaled through a bitstream. Sign prediction information may be signaled through a higher header. A higher header may include at least one of a sequence parameter set, a picture parameter set or a slice header. Alternatively, sign prediction information may be signaled in a unit of a block. As an example, sign prediction information may be signaled per coding tree block, coding block or transform block.

As another example, at least one of the number of a position of residual coefficients which will predict a sign may be adaptively determined based on at least one of a size of a current block, a shape of a current block, an encoding mode of a current block, an intra prediction mode of a current block, a ratio of residual coefficients with negative sign and residual coefficients with a positive sign among pre-encoded/pre-decoded residual coefficients, the number of non-zero residual coefficients, a transform core applied to a current block or whether second transform was applied to a current block. Here, an encoding mode may include inter prediction and inter prediction. Alternatively, when the same sign is repeatedly detected as much as a predefined threshold value, sign prediction may be applied to a current residual coefficient for which a sign must be determined or a current residual coefficient and N residual coefficients that are consecutive with a current residual coefficient in scan order. Here, a threshold value may be a natural number such as 2, 3, 4, etc.

As another example, at least one of the number or a position of residual coefficients which will predict a sign may be fixed. As an example, sign prediction may be always used for a last non-zero residual coefficient in a current block. Alternatively, sign prediction may be applied to N consecutive residual coefficients in scan order, starting from a last non-zero residual coefficient in a current block. Here, N may be a natural number such as 1, 2, 3, 4, etc.

Alternatively, sign prediction may be always used for a residual coefficient which is a low-frequency component within a current block, e.g., a DC component. Alternatively, sign prediction may be applied to a residual coefficient that is a DC component and N residual coefficients whose scan order is lower than a DC component in scan order.

Alternatively, sign prediction may be performed for four residual coefficients belonging to a 2×2-sized sub-block at a top-left position of a current block or two residual coefficients belonging to a 1×2 or 2×1-sized sub-block at a top-left position of a current block.

As another example, whether to apply sign prediction to a current residual coefficient may be determined by comparing an absolute value of a current residual coefficient with a preset threshold value. In this case, a threshold value may have a value predefined in an encoder and a decoder.

Alternatively, a threshold value may be set in a unit of a block. In this case, information on a threshold value may be signaled through a bitstream. Alternatively, a threshold value may be adaptively determined based on at least one of a size of a current block, an encoding mode of a current block, an intra prediction mode of a current block or a quantization parameter of a current block.

Only when sign prediction for a preset number of residual coefficients is not performed, sign prediction may be set to be performed for a residual coefficient with an absolute value lower than a threshold value.

As another example, residual coefficients on which sign prediction is performed may be selected by comparing an absolute value of each residual coefficient. As an example, N residual coefficients with a large absolute value may be set as a sign prediction target. As an example, when two are preset, sign prediction may be performed for two residual coefficients with the largest absolute value among residual coefficients.

For at least one residual coefficient that is a sign prediction target, a reconstructed block for each sign combination may be generated by applying each applicable sign combination S1610 and S1710.

Figure 18:
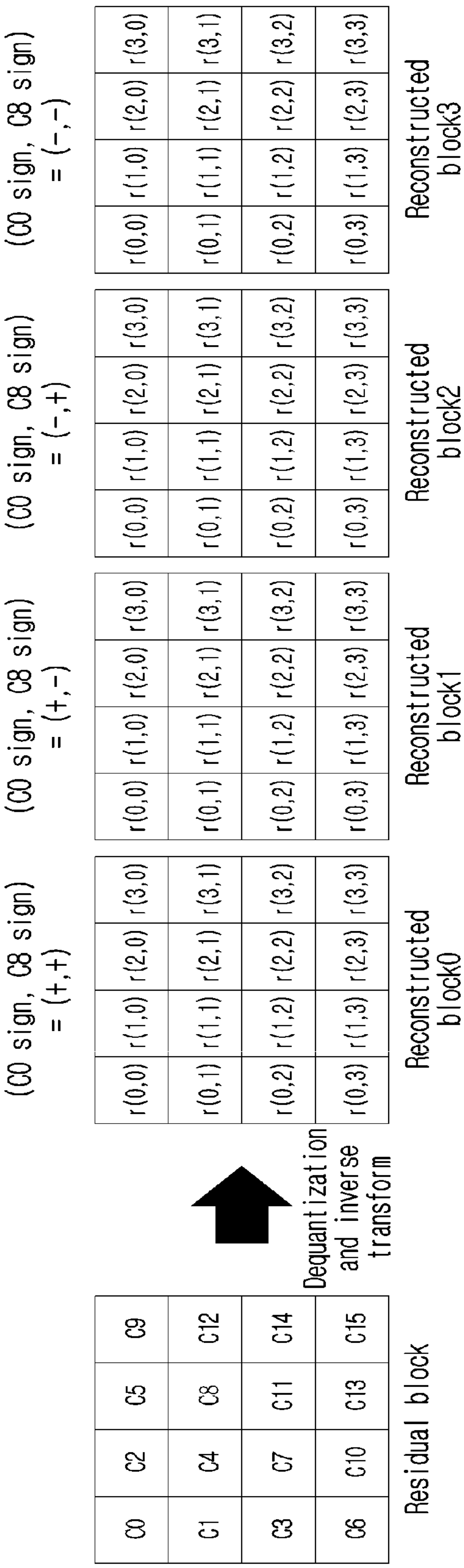
FIG. 18 shows an example in which different sign combinations are applied to generate a plurality of reconstructed blocks.

FIG. 18 shows an example in which different sign combinations are applied to generate a plurality of reconstructed blocks.

In the example shown in FIG. 18, sign prediction is shown to be applied to the residual coefficient C0 and residual coefficient C8.

When sign prediction is applied to N residual coefficients, there are 2^N applicable sign combinations. For example, as in the example shown in FIG. 18, the four sign combinations that can be applied to the residual coefficient C0 and residual coefficient C8 are (+, +), (+, −), (−, +), and It can be (−, −).

By applying each sign combination, a restored block can be generated. The restored block may be derived by combining the residual block and the prediction block. Here, the residual block can be obtained by performing inverse quantization and inverse transformation on the residual coefficients. Alternatively, depending on whether transformation has been applied to the current block, the inverse transformation may be skipped and a residual block may be generated.

For example, in the example shown in FIG. 18, restoration block 0 is generated based on the residual block obtained by applying the sign combination (+, +), and the residual block obtained by applying the sign combination (+, −) It is shown that restoration block 1 is generated based on. In addition, restoration block 2 is generated based on the residual block obtained by applying the sign combination (−, +), and restoration block 3 is generated based on the residual block obtained by applying the sign combination (−, −). It has been exemplified.

Afterwards, the cost for each restoration block can be calculated (S1620, S1720). By comparing the cost of each restored block, the sign prediction value of the residual coefficient to which sign prediction is applied can be set.

The cost of a restored block can be calculated by considering the relationship between the restored block and the restored samples surrounding the restored block.

Figure 19:
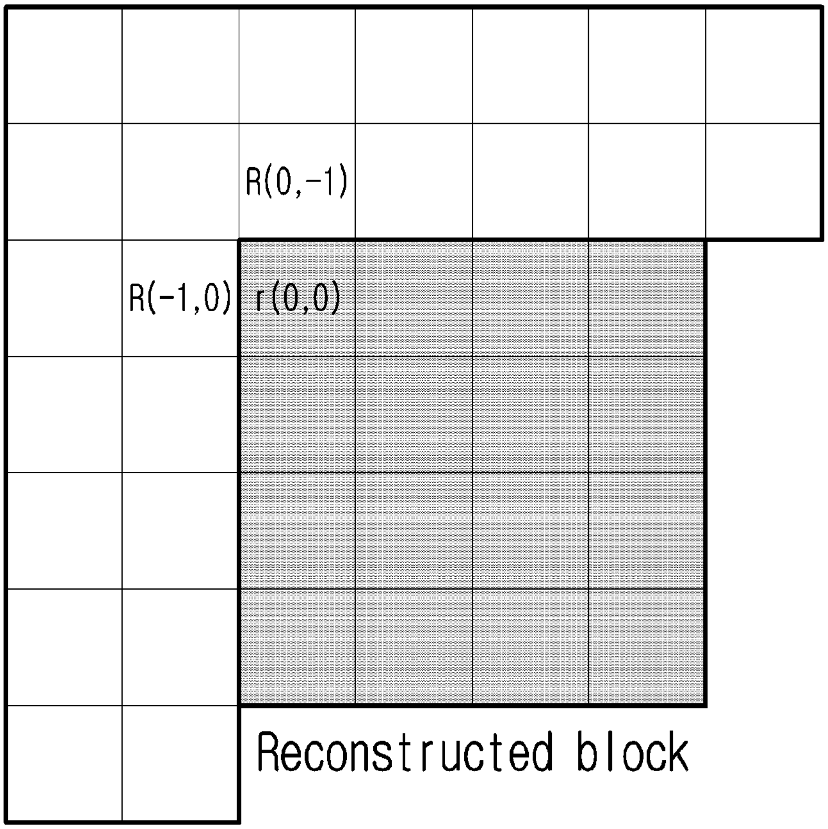
FIG. 19 shows an example in which a cost of a reconstructed block is calculated.

FIG. 19 shows an example in which a cost of a reconstructed block is calculated.

In the example shown, R represents the reconstruction sample and r represents the residual sample.

The cost of a restored block can be calculated using restored samples located adjacent to a specific boundary of the restored block. Here, the specific boundary may include at least one of the top boundary or the left boundary of the restored block.

As an example, the horizontal cost for a restored block can be calculated using restored samples adjacent to the upper boundary of the restored block. Additionally, the vertical cost for the restored block can be calculated using restored samples adjacent to the left boundary of the restored block. And, the sum of the horizontal cost and the vertical cost can be set as the cost of the restoration block. Equation 2 shows the process by which the cost of a restoration block is calculated.

[Equation 2]

$$\text{cost1} = \sum_{y=0}^{h-1} |(-R(-2, y) + 2R(-1, y) - P(0, y)) - r(0, y)|$$

-continued $$\text{cost2} = \sum_{x=0}^{w-1} |(-R(x, -2) + 2R(x, -1) - P(x, 0)) - r(x, 0)|$$

$$\text{cost} = \text{cost1} + \text{cost2}$$

In Equation 2, cost1 represents the horizontal cost generated based on the residual samples and prediction samples adjacent to the left border of the restored block, and cost2 represents the residual samples and prediction samples adjacent to the upper border of the restored block. Indicates the vertical cost generated as a basis. cost represents the cost of the residual block. R represents the restored samples around the restored block.

P represents the prediction sample of the restored sample within the restored block, and r represents the residual sample value of the restored sample. Since the restored block is derived by combining the residual block and the prediction block, as in the example of Equation 2, the cost of the restored block may be understood as being calculated using the residual block and the prediction block.

Equation 2 can also be simplified as the following Equation 3.

[Equation 3]

$$\text{cost1} = \sum_{y=0}^{h-1} |(-R(-2, y) + 2R(-1, y) - R(0, y))|$$

$$\text{cost2} = \sum_{x=0}^{w-1} |(-R(x, -2) + 2R(x, -1) - R(x, 0))|$$

$$\text{cost} = \text{cost1} + \text{cost2}$$

The horizontal cost cost1 can be derived as the sum of the horizontal gradients for restored samples adjacent to the left border of the residual block. Here, the horizontal change amount is twice the value of the restored sample R (−1, y) adjacent to the left border of the restored block, and the restored sample R (−2) adjacent to the left of the restored sample R (−1, y), y), the predicted sample P (0, y) and the residual sample r (0, y) for the restored sample represent the differential values.

The vertical cost cost1 can be derived as the sum of vertical gradients for restored samples adjacent to the upper boundary of the restored block. Here, a vertical change amount represents a value obtained by subtracting a reconstructed sample R (x, −2) adjacent to the top of the reconstructed sample R (x, −1), a prediction sample P (x, 0) for a reconstructed sample and a residual sample r (x, 0) from a value twice a reconstructed sample R (x, −1) neighboring a top boundary of a reconstructed block.

Unlike an example in Equation 2, a horizontal cost, cost1, may be set as a cost of a reconstructed block or a vertical cost, cost2, may be set as a cost of a reconstructed block. As an example, when an intra prediction mode of a current block is a directional prediction mode, a horizontal cost or a vertical cost may be set as a cost of a reconstructed block according to a direction of an intra prediction mode.

As an example, in an example shown in FIG. 3, based on an intra prediction mode in a top-left diagonal direction (mode 34), directional intra prediction modes may be classified into a top region intra prediction mode and a left region intra prediction mode. A top region intra prediction mode represents an intra prediction mode in which an index is equal to or greater than an intra prediction mode in a diagonal direction, and a left region intra prediction mode represents an intra prediction mode in which an index is smaller than an intra prediction mode in a diagonal direction.

If an intra prediction mode of a current block is a top region intra prediction mode, a vertical cost derived by using reconstructed samples adjacent to a top boundary of a reconstructed block may be set as a cost of a reconstructed block. On the other hand, when an intra prediction mode of a current block is a left region intra prediction mode, a horizontal cost derived by using reconstructed samples adjacent to a left boundary of a reconstructed block may be set as a cost of a reconstructed block.

Meanwhile, if an intra prediction mode of a current block is a nondirectional mode, e.g., a planner mode or a DC mode, a sum of a horizontal cost and a vertical cost may be set as a cost of a reconstructed block, as in Equation 2.

Even when inter prediction is applied to a current block, a sum of a horizontal cost and a vertical cost may be set as a cost of a reconstructed block.

In Equation 2, it was illustrated that a horizontal cost is calculated by using two reconstructed samples belonging to the same row as a reconstructed sample and a vertical cost is calculated by using two reconstructed samples belonging to the same column as a reconstructed sample. In other words, it was illustrated that a horizontal cost and a vertical cost are calculated by using reconstructed samples belonging to two reference sample lines around a reconstructed block.

A horizontal cost and/or a vertical cost may be calculated by using fewer reference sample lines than the example. As an example, a horizontal cost and/or a vertical cost may be calculated by using reconstructed samples belonging to one reference sample line adjacent to a boundary of a residual block. In this case, a vertical cost and a horizontal cost of a current block may be calculated as in Equation 4 below.

[Equation 4]

$$\text{cost1} = \sum_{y=0}^{h-1} |(R(-1, y) - P(0, y)) - r(0, y)|$$

$$\text{cost2} = \sum_{x=0}^{w-1} |(R(x, -1) - P(x, 0)) - r(x, 0)|$$

Alternatively, more than two reference sample lines may be used to calculate a horizontal cost and/or a vertical cost.

As another example, instead of calculating a horizontal cost and/or a vertical cost by using only reconstructed samples positioned at a boundary of a reconstructed block, reconstructed samples belonging to N columns and/or rows from a boundary of a reconstructed block may be used to calculate a horizontal cost and/or a vertical cost.

Instead of using a reconstructed sample around a current block belonging to the same column or the same row as a reconstructed sample, a position of a reconstructed sample may be adaptively determined according to an encoding mode and/or an intra prediction mode applied to a current block.

As an example, if an intra prediction mode of a current block is a non-directional mode, e.g., a planar mode or a DC mode, as in Equation 2, a horizontal cost may be calculated by using at least one reconstructed sample belonging to the same as row a reconstructed sample and a vertical cost may be calculated by using at least one reconstructed sample belonging to the same column as a reconstructed sample.

On the other hand, when an intra prediction mode of a current block is a directional prediction mode, at least one reconstructed sample may be selected according to directivity of an intra prediction mode.

Figure 20:
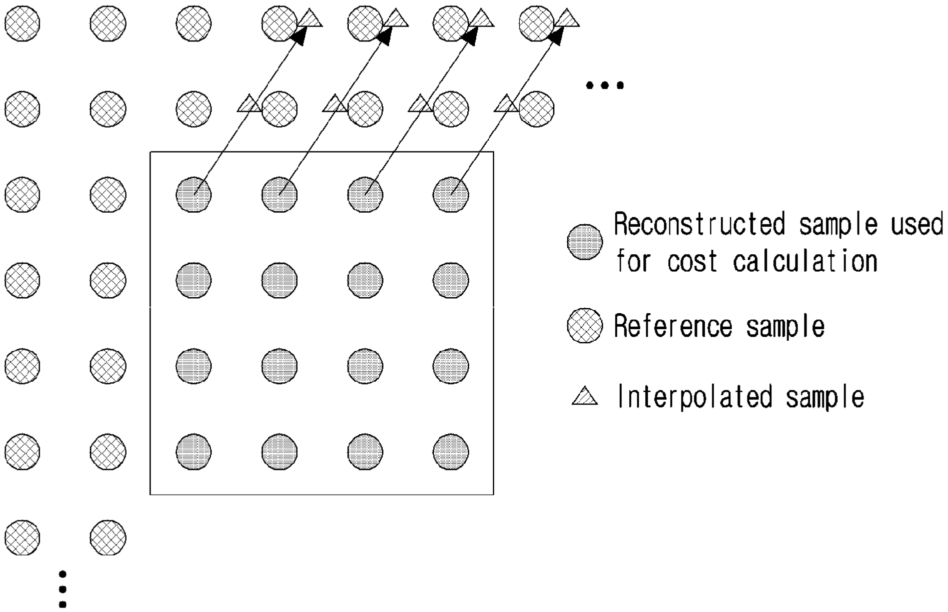
FIG. 20 shows an example in which a reconstructed sample is selected by directivity of an intra prediction mode.

FIG. 20 shows an example in which a reconstructed sample is selected by directivity of an intra prediction mode.

In FIG. 20, it was illustrated that an intra prediction mode of a current block is an intra prediction mode in a top-right direction. In this case, in calculating a vertical gradient, instead of a reconstructed sample neighboring a vertical direction of a reconstructed sample, a reconstructed sample in a top-right direction of a reconstructed sample may be used.

When a top-right direction of a reconstructed sample passes through a fractional position, a fractional position sample may be generated by interpolating reconstructed samples neighboring a fractional position, and a vertical gradient may be calculated by using a generated fractional position sample.

As another example, when a top-right direction of a reconstructed sample passes through a fractional position, a vertical gradient may be calculated by using an integer position reconstructed sample closest to a fractional position, instead of using an interpolated sample.

Based on template matching, a cost of a reconstructed block may be also calculated.

Figure 21:
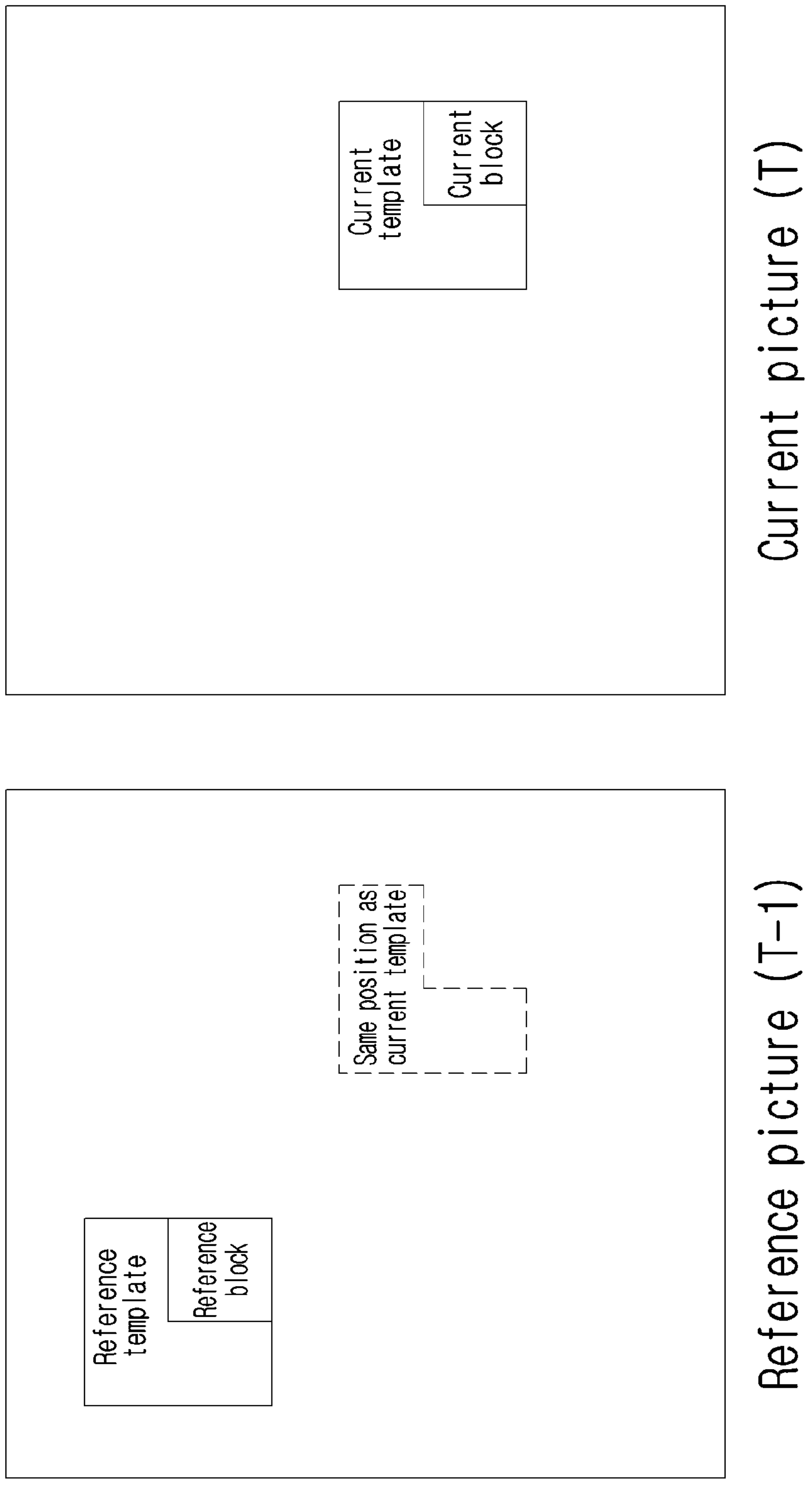
FIG. 21 is a diagram for describing an example in which a cost of a reconstructed block is calculated based on template matching.

FIG. 21 is a diagram for describing an example in which a cost of a reconstructed block is calculated based on template matching.

A surrounding region of a current block may be set as a current template and a reference template that is most similar to a current template in a reference picture may be searched. Once a reference template is determined, a reference block is set based on a reference template. Afterwards, a cost of a reconstructed block is calculated based on a difference between a reconstructed block and a reference block. As an example, a Sum of Absolute Difference (SAD) between reconstructed samples in a reconstructed block and reconstructed samples in a reference block may be set as a cost of a reconstructed block.

In this case, a cost of a reconstructed block may be calculated by using only reconstructed samples positioned at a boundary of a reconstructed block. As an example, a cost of a reconstructed block may be calculated by subtracting reconstructed samples positioned at a left boundary of a reference block and reconstructed samples positioned at a top boundary of a reference block from reconstructed samples positioned at a left boundary of a reconstructed block and reconstructed samples positioned at a top boundary of a reconstructed block.

In an encoder, a sign combination used in a reconstructed block in which an actual sign of each residual coefficient to which sign prediction is applied has the lowest cost may be set as a sign prediction value for each residual coefficient. In addition, it is possible to determine whether a sign of each residual coefficient to be encoded matches a predicted sign and to encode and signal sign prediction information representing whether there is a match S1630. The sign prediction information may be encoded for each residual coefficient to which sign prediction is applied.

In addition, the information may be a 1-bit flag.

As an example, when sign prediction is applied to two residual coefficients, if a sign of a first residual coefficient used to obtain a reconstructed block with the lowest cost matches a sign of an actual first residual coefficient, sign prediction information on the first residual coefficient may be set to be true, and otherwise, sign prediction information on the first residual coefficient may be set to be false. A sign of a second residual coefficient is also the same as in an encoding method of a first residual coefficient described above.

A decoder may determine a sign of a residual coefficient based on a cost of each of a plurality of reconstructed blocks and sign prediction information of a residual coefficient to which sign prediction is applied S1730.

As an example, when it is assumed that sign prediction is applied to two residual coefficients, if sign prediction information on each of two residual coefficients indicates that a predicted sign matches an actual sign, for each of two residual coefficients, a predicted sign may be set as an actual sign. A decoder may perform dequantization and/or inverse transform for residual coefficients to obtain a residual block and obtain a reconstructed block based on an obtained residual block. Alternatively, a reconstructed block with the lowest cost among four reconstructed blocks may be selected as a reconstructed block of a current block.

On the other hand, when sign prediction information on a first residual coefficient of two residual coefficients indicates that a predicted sign matches an actual sign, but sign prediction information on a second residual coefficient indicates that a predicted sign does not match an actual sign, a sign of a first residual coefficient may be set to be the same as a predicted sign, while a sign of a second residual coefficient may be set to be opposite to a predicted sign. A decoder may perform dequantization and/or inverse transform for residual coefficients to obtain a residual block and obtain a reconstructed block based on a residual block. Alternatively, a reconstructed block that a sign of a first residual coefficient matches that of a reconstructed block with the lowest cost, but a sign of a second residual coefficient does not match it may be selected as a reconstructed block of a current block.

On the other hand, when sign prediction is applied to two residual coefficients and sign prediction information for each of two residual coefficients indicates that it does not match an actual sign, a sign of each of two residual coefficients may be set to be opposite to a predicted value. A decoder may perform dequantization and/or inverse transform for residual coefficients to obtain a residual block and obtain a reconstructed block based on a residual block. Alternatively, a reconstructed block that both a sign of a first residual coefficient and a sign of a second residual coefficient are different from those of a reconstructed block with the lowest cost may be selected as a reconstructed block of a current block.

As a result, a sign of a residual coefficient is set as a predicted sign for a reconstructed block with the lowest cost, while a final sign of a residual coefficient may be determined based on a predicted sign and sign prediction information explicitly signaled.

When sign prediction is performed, sign information may be explicitly encoded and signaled for the remaining residual coefficients excluding residual coefficients on which sign prediction is performed. On the other hand, for residual coefficients on which sign prediction is performed (e.g., C0 and C8 in FIG. 18), instead of explicitly encoding/decoding sign information, sign prediction information may be explicitly encoded/decoded.

In this case, sign prediction information may be encoded/decoded based on probability information. As an example, the information may be entropy-encoded by allocating a high probability to a case in which a predicted sign matches an actual sign and allocating a low probability to an opposite case. As another example, a probability may be adaptively set according to a position of a residual coefficient that is a sign prediction target. As an example, for a residual coefficient that is a DC component rather than a residual coefficient that is an AC component, a higher probability may be given to a case in which a predicted sign combination matches an actual sign combination.

In other words, for a residual coefficient, coding/decoding efficiency may be improved by using sign prediction information encoded through context coding based on context information, instead of sign information encoded through bypass coding in which context information is not used.

Meanwhile, whether sign prediction for a residual coefficient is allowed may be determined based on at least one of a size of a current block, a quantization parameter of a current block, an encoding mode of a current block, an intra prediction mode of a current block, whether transform is skipped in a current block or a transform core of a current block.

As an example, sign prediction for residual coefficients may be allowed only when transform skip is not applied to a current block. Alternatively, conversely, sign prediction for residual coefficients may be allowed only when transform skip is applied to a current block.

Only when sign prediction is allowed for a current block, sign prediction information, instead of sign information, may be encoded and signaled.

Meanwhile, in generating a reconstructed block for each sign combination, a reconstructed block may be generated by using a simplified method. As an example, instead of performing inverse transform, a reconstructed block may be obtained by using a simplified method.

As an example, in an example shown in FIG. 18, residual values may be reconstructed by performing inverse transform for one sign combination (hereinafter, referred to as a first sign combination) among four sign combinations. On the other hand, instead of performing inverse transform for the remaining three sign combinations excluding the sign combination, based on residual values obtained for a first sign combination (i.e., residual values generated through inverse transform), residual values may be obtained. As an example, a residual value at a specific position among residual values for a second sign combination may be derived by adding or subtracting an offset to or from a residual value at a specific position among residual values obtained for a first sign combination, and residual values at a remaining position may be derived in the same way as residual values of a first sign combination. In this case, at least one of a size/a sign of an offset or a position at which an offset is added/subtracted may be different per sign combination. As an example, inverse transform may be normally performed only for a (+, +) combination among four sign combinations, and for other (+, −), (−, +) and (−, −) combinations, a simplified method may be used to reconstruct residual values.

When an optimal sign combination is determined by comparing a cost of each reconstructed block, a residual value may be reconstructed normally by performing inverse transform for a corresponding combination.

Instead of encoding and signaling sign prediction information, an optimal sign combination may be directly determined as a sign of a residual coefficient. In other words, a decoder may determine an implicitly predicted sign as a sign of a residual coefficient. In this case, a 1-bit flag representing whether to set an optimal sign combination as a sign of residual coefficients may be separately encoded and signaled.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described disclosure is described based on a series of steps or flow charts, but it does not limit a time series order of the present disclosure and if necessary, it may be performed at the same time or in different order. In addition, each component (e.g., a unit, a module, etc.) configuring a block diagram in the above-described disclosure may be implemented as a hardware device or software and a plurality of components may be combined and implemented as one hardware device or software. The above-described disclosure may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL AVAILABILITY

The present disclosure may be applied to an electronic device which may encode/decode an image.

The invention claimed is:

1. A method of decoding an image, the method comprising:

determining target residual coefficients of a current block to which a sign prediction is applied;

deriving a residual block for each sign combination of the target residual coefficients;

calculating a cost for each sign combination based on the residual block derived for the respective sign combination; and determining a sign of each target residual coefficient based on a sign combination having the lowest cost among a plurality of sign combinations, wherein first sign information is explicitly signaled for remaining residual coefficients other than the target residual coefficients, wherein second sign information is explicitly signaled for the target residual coefficients, and wherein the first sign information is decoded in a bypass mode while the second sign information is decoded in a regular coding mode using context information.

2. The method of claim 1, wherein the target residual coefficients include a DC (Direct Current) component residual coefficient.

3. The method of claim 1, wherein the target residual coefficients include a residual coefficient at a last non-zero position.

4. The method of claim 1, wherein a cost of the sign combination is obtained based on at least one of a vertical directional cost and a horizontal directional cost, wherein the vertical directional cost is obtained by subtracting a residual sample positioned at a top boundary of the current block from a top reference value, the top reference value being obtained by subtracting a prediction sample positioned at a top boundary of the current block from a top neighboring reconstructed sample adjacent to the current block, and wherein the horizontal directional cost is obtained by subtracting a residual sample positioned at a left boundary of the current block from a left reference value, the left reference value being obtained by subtracting a prediction sample positioned at the left boundary of the current block from a left neighboring reconstructed sample adjacent to the current block.

5. The method of claim 4, wherein when an intra prediction mode of the current block is a non-directional intra prediction mode, the cost of the sign combination is determined as a sum of the horizontal directional cost and the vertical directional cost.

6. The method of claim 4, wherein when an intra prediction mode of the current block is a directional prediction mode, the cost of the sign combination is determined either the horizontal directional cost or the vertical directional cost.

7. The method of claim 1, wherein whether it is allowed to apply the sign prediction to the current block is determined based on at least one of a size of the current block, a quantization parameter, an encoding mode, an intra prediction mode or whether a transform skip is applied to the current block.

8. The method of claim 1, wherein the first sign information indicates whether a sign of a residual coefficient is positive, and wherein the second sign information indicates whether a sign of a residual coefficient is identical to a sign in the sign combination with the lowest cost.

9. The method of claim 1, wherein probability information for decoding the second sing information is determined based on a position of a target residual coefficient.

10. A method of encoding an image, the method comprising:

determining target residual coefficients of a current block to which a sign prediction is applied;

deriving a residual block for each sign combination of the target residual coefficients;

calculating a cost for each sign combination based on the residual block derived for the respective sign combination; and generating sign prediction information for the target residual coefficients based on a sign combination the lowest cost among a plurality of sing combinations wherein first sign information is explicitly encoded for remaining residual coefficients other than the target residual coefficients;

wherein second sign information is explicitly encoded for the target residual coefficients, and wherein the first sign information is encoded in a bypass mode while the second sign information is encoded in a regular coding mode using context information.

11. The method of claim 10, wherein the target residual coefficients include a DC (Direct Current) component residual coefficient.

12. The method of claim 10, wherein probability information for encoding the second sign information is determined based on a position of the target residual coefficient.

13. A method of transmitting compressed video data, the method comprising:

generating the compressed video data by encoding a video; and transmitting the compressed video data, wherein generating the compressed video data comprises:
determining target residual coefficients of a current block to which a sign prediction is applied;
deriving a residual block for each sign combination of the target residual coefficients;
calculating a cost for each sign combination based on the residual block derived for the respective sign combination; and
generating sign prediction information for the target residual coefficients based on a sign combination the lowest cost among a plurality of sing combinations
wherein first sign information is explicitly encoded for remaining residual coefficients other than the target residual coefficients,
wherein second sign information is explicitly encoded for the target residual coefficients, and
wherein the first sign information is encoded in a bypass mode while the second sign information is encoded in a regular coding mode using context information.

* * * * *